(12) United States Patent
Yamada

(10) Patent No.: US 9,965,099 B2
(45) Date of Patent: May 8, 2018

(54) INPUT DEVICE

(71) Applicant: ALPS ELECTRIC CO., LTD., Tokyo (JP)

(72) Inventor: Tomoki Yamada, Miyagi-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 0 days. days.

(21) Appl. No.: 15/420,993

(22) Filed: Jan. 31, 2017

(65) Prior Publication Data
US 2017/0139544 A1   May 18, 2017

Related U.S. Application Data

(63) Continuation of application No. PCT/JP2015/069539, filed on Jul. 7, 2015.

(30) Foreign Application Priority Data

Aug. 5, 2014  (JP) .................. 2014-159854

(51) Int. Cl.
G06F 3/041 (2006.01)
G06F 3/045 (2006.01)
G06F 3/044 (2006.01)

(52) U.S. Cl.
CPC ............ *G06F 3/0418* (2013.01); *G06F 3/044* (2013.01); *G06F 2203/04104* (2013.01); *G06F 2203/04106* (2013.01); *G06F 2203/04108* (2013.01)

(58) Field of Classification Search
CPC .......... G06F 3/0418; G06F 3/044; G06F 2203/04106; G06F 2203/04104; G06F 2203/04108

USPC .................................... 345/173–174
See application file for complete search history.

(56) References Cited

U.S. PATENT DOCUMENTS

| 9,081,453 | B2* | 7/2015 | Bulea ..................... G06F 3/044 |
| 9,886,151 | B2* | 2/2018 | Lee ......................... G06F 3/044 |
| 9,904,464 | B2* | 2/2018 | Yanase ................. G06F 3/04883 |

(Continued)

FOREIGN PATENT DOCUMENTS

| JP | 2007-240479 A | 9/2007 |
| JP | 2013-526746 A | 6/2013 |

OTHER PUBLICATIONS

International Search Report for corresponding International Patent Application No. PCT/JP2015/069539, dated Aug. 25, 2015, 3 pages.

Primary Examiner — Amit Chatly
(74) Attorney, Agent, or Firm — Brinks Gilson & Lione

(57) ABSTRACT

Electrodes of a sensor unit are fewer than segments; and, are arranged so that at least one electrode has an overlapping portion in each segment. An element data configuration part repeats processing of correcting a number m of provisional element data on the basis of predetermined information determined in accordance with an electrode pattern and a segment pattern on an operation surface so that a number n of provisional detection data calculated from the number m of provisional element data on the basis of the predetermined information approach a number n of detection data output from a capacitance detection part.

14 Claims, 18 Drawing Sheets

(56) References Cited

U.S. PATENT DOCUMENTS

| | | | |
|---|---|---|---|
| 2011/0279169 A1* | 11/2011 | Salaverry | G06F 3/0416 327/517 |
| 2012/0026126 A1* | 2/2012 | Park | G06F 3/044 345/174 |
| 2012/0038584 A1 | 2/2012 | Liu | |

* cited by examiner

FIG. 7

| PA₁ | PA₂ | PA₃ | PA₄ | PA₅ | PA₆ | |
|---|---|---|---|---|---|---|
| 1 | 1 | 1 | 1 | 1 | 1 | INITIAL VALUE |
| 2.25 | 2.75 | 3.25 | 3.75 | 4.25 | 4.75 | FIRST REPEAT |
| 1.76 | 2.38 | 3.01 | 3.77 | 4.63 | 5.47 | SECOND REPEAT |
| 1.53 | 2.19 | 2.86 | 3.75 | 4.82 | 5.86 | THIRD REPEAT |
| 1.42 | 2.09 | 2.78 | 3.72 | 4.91 | 6.07 | FOURTH REPEAT |
| ⋮ | ⋮ | ⋮ | ⋮ | ⋮ | ⋮ | |
| 1.31 | 1.99 | 2.70 | 3.69 | 5.01 | 6.30 | TENTH REPEAT |
| | | | | | | |
| 1 | 2 | 3 | 4 | 5 | 6 | ORIGINAL DATA |

INPUT DEVICE

CLAIM OF PRIORITY

This application is a Continuation of International Application No. PCT/JP2015/069539 filed on Jul. 7, 2015, which claims benefit of priority to Japanese Patent Application No. 2014-159854 filed on Aug. 5, 2014. The entire contents of each application noted above are hereby incorporated by reference.

BACKGROUND

1. Field of the Disclosure

The present disclosure relates to an input device used for inputting information in an information apparatuses, such as a computer or a smart phone. In particular, the present invention relates to an input device that specifies a region in which an object, such as a finger or a pen, approaches an operation surface, and inputs information on the basis of the specified region.

2. Description of the Related Art

Input devices have been widely used that include a sensor that detects a contact position of a finger in accordance with a change in capacitance, as an interface of an electronic apparatus, such as a smart phone or a notebook personal computer. Capacitance sensors include an inter-capacitance sensor that detects a change in capacitance between a drive electrode and a detection electrode, and a self-capacitance sensor that detects a change in capacitance of a detection electrode with respect to a ground (finger). To realize, for example, a hovering function that detects an operation with a finger at a position separated from the operation surface, the self-capacitance sensor with high detection sensitivity for capacitance is advantageous.

Self-capacitance sensors have two sensing systems of image sensing and profile sensing. The image sensing system detects a two-dimensional distribution of a contact with a finger. The profile sensing system detects a one-dimensional distribution of a contact with a finger in at least one direction. U.S. Patent Application Publication No. 2012/0026126 (US2012/0026126A1) describes a touch screen using the image sensing system. Also, U.S. Patent Application Publication No. 2012/0038584 (US2012/0038584A1) describes a touch panel using the profile sensing system.

FIG. 18A is an illustration showing a configuration of the image sensing system of the self-capacitance sensor. As shown in FIG. 18A, a change in self-capacitance of detection electrodes 101 arranged in a matrix on an operation surface is detected, and hence two-dimensional data representing a two-dimensional distribution of a change in self-capacitance on the operation surface is obtained. Hence, even when a plurality of objects contact the operation surface, correct coordinates of the respective objects can be calculated.

However, in the image sensing system, electrodes by the same number as the number of all elements in the matrix (in the example in FIG. 18A, 12 electrodes) are required to be connected with a detection circuit 102, and hence the circuit scale is larger than that of the profile sensing system. Also, if the number of the detection electrodes increases, the time required for scanning all the detection electrodes increases. The scanning time and the number of times of scanning per single periodic sensing processing have to be decreased. Hence, it is difficult to detect a capacitance with high sensitivity.

FIG. 18B is an illustration showing a configuration of the profile sensing system of the self-capacitance sensor. In the profile sensing system, detection electrodes 103 extending in at least one direction (in the example in FIG. 18B, two directions of longitudinal and transverse directions) and connected with a detection circuit 104. Hence, the number of the detection electrodes is smaller than that of the image sensing system, and the circuit scale is smaller. Since the number of the detection electrodes is small, the scanning time and the number of times of scanning per single processing can be increased, and hence the detection sensitivity for capacitance is likely increased. Also, a large size of the detection electrodes is advantageous to detection for capacitance with high sensitivity.

However, in the profile sensing system, the two-dimensional data representing the two-dimensional distribution of the change in self-capacitance on the operation surface cannot be obtained. Owing to this, when a plurality of objects contact the operation surface, the coordinates at which an object does not actually contact (ghost) may be erroneously recognized as the coordinates of the contact position of an object.

SUMMARY

An input device is disclosed for inputting information corresponding to an approach of an object with respect to an operation surface. The input device includes a number n of electrodes arranged on the operation surface so that at least one of the electrodes has an overlapping portion with each of a number m of segments. The segments are obtained by dividing the operation surface, n being a natural number smaller than m; a capacitance detection part outputting a number n of detection data corresponding to first capacitances formed between the object approaching the operation surface and the number n of electrodes. An element data configuration part configures element data corresponding to a third capacitance for each of the number m of segments, the third capacitance being obtained by combining a second capacitance, the second capacitance being formed between the overlapping portion of at least one of the electrodes located in one of the segments and the object. Each of the number n of electrodes is different from another one of the electrodes in at least one of a combination of the segments including the overlapping portion and an area of the overlapping portion included in the same segment. The element data configuration part configures a number m of the element data corresponding to the number m of segments on the basis of predetermined information relating to an area ratio of the overlapping portion of individual one of the electrodes to all the overlapping portions located in the same segment in each of the number m of segments, and the number n of detection data output from the capacitance detection part.

With the above-described configuration, the second capacitance formed between the overlapping portion of one of the electrodes located in one of the segments and the object is substantially proportional to the area of the overlapping portion. Since the third capacitance is obtained by combining the second capacitance, the third capacitance is substantially proportional to the area of all the overlapping portions located in the one segment. Accordingly, information relating to the area ratio included in the predetermined information gives information relating to a capacitance ratio between the second capacitance of the one electrode in the one segment and the third capacitance.

Also, since the first capacitance formed between the one electrode and the object is assumed as a value obtained by combining the second capacitances of all the overlapping portions belonging to the one electrode and the object, the detection data corresponding to the first capacitance gives information relating to the second capacitance of the one electrode in one or a plurality of the segments.

Also, the number n of electrodes each have an overlapping portion in a different combination of the segments from that of another electrode, or each have a different area of the overlapping portion included in the same segment from that of another electrode. Owing to this, the number n of detection data obtained for the number n of electrodes give independent information relating to the second capacitances of the respective electrodes in the number m of segments.

The element data configuration part configures the number m of element data corresponding to the third capacitances in the number m of segments on the basis of the information relating to the second capacitances of the respective electrodes in the number m of segments included in the number n of detection data, and the information relating to the capacitance ratio of the respective electrodes of the number m of segments given by the predetermined information.

Accordingly, the number m of element data representing the approach state with respect to the object in the number m of segments are obtained by using the number n of electrodes fewer than the number m of segments.

BRIEF DESCRIPTION OF THE DRAWINGS

FIG. 7 is an illustration showing an example in which element data is configured by repetition of data configuration processing;

DESCRIPTION OF THE EXEMPLARY EMBODIMENTS

First Embodiment

Figure 1:
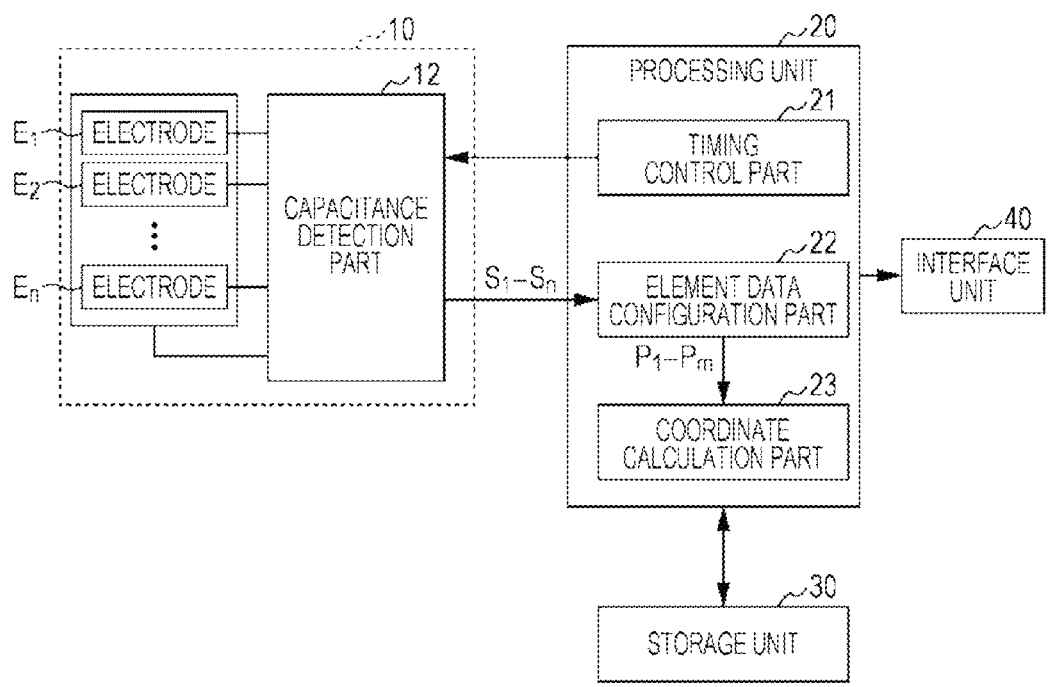
FIG. 1 is an illustration showing an example of a configuration of an input device according to an embodiment of the present invention.

FIG. 1 is an illustration showing an example of a configuration of an input device according to an embodiment of the present invention.

The input device shown in FIG. 1 includes a sensor unit 10, a processing unit 20, a storage unit 30, and an interface unit 40. The input device according to this embodiment is a device that, when an object, such as a finger or a pen, contacts or approaches an operation surface provided with a sensor, inputs information corresponding to the position of the contact or approach. It is to be noted that "approach" in this specification includes both close arrangement in a contact manner, and close arrangement in a non-contact manner.

Sensor Unit 10

The sensor unit 10 includes a number n of electrodes $E_1$ to $E_n$ arranged on the operation surface, and a capacitance detection part 12 that, when an object, such as a finger or a pen, approaches the electrodes $E_1$ to $E_n$, detects capacitances (first capacitances) formed between the object and the electrodes $E_1$ to $E_n$.

The operation surface having the number n of electrodes $E_1$ to $E_n$ arranged is divided into a number m (m>n) of segments $A_1$ to $A_m$ serving as configuration units of element data ($P_1$ to $P_m$) (described later). In the following description, arbitrary one of the electrodes $E_1$ to $E_n$ may be occasionally representatively described as "electrode E" or "electrode $E_i$" ($1 \leq i \leq n$). Also, arbitrary one of the segments $A_1$ to $A_m$ may be occasionally representatively described as "segment A" or "segment $A_j$" ($1 \leq j \leq m$).

The electrodes $E_1$ to $E_n$ are fewer than the segments $A_1$ to $A_m$; however, are arranged so that at least one electrode E has an overlapping portion in each segment A.

Also, the electrodes $E_1$ to $E_n$ each are arranged to have an overlapping portion in a different combination of segments A. For example, if the electrode $E_1$ has an overlapping portion in the segments $A_1$ and $A_2$, another electrode E is arranged in a combination of segments A other than the combination ($A_1$, $A_2$). If there are a plurality of electrodes E having overlapping portions in the same combination of segments A, in the electrodes E, the areas of the overlapping portions may differ from one another in at least part of the segments.

That is, the electrodes $E_1$ to $E_n$ are arranged on the operation surface so as to have mutually different overlapping patterns with respect to the segments $A_1$ to $A_m$.

The capacitance detection part 12 sequentially drives each electrode E, samples an electric charge corresponding to a capacitance (a first capacitance) formed between the electrode E and an object, and outputs detection data corresponding to the sampling result.

To be specific, the capacitance detection part 12 includes a drive circuit, a capacitance-voltage conversion circuit (a CV conversion circuit), and an A/D conversion circuit. The drive circuit sequentially selects the electrodes $E_1$ to $E_n$ under control of the processing unit 20, repetitively applies a pulse voltage with a predetermined amplitude to the selected electrode E, and repetitively charges or discharges the capacitance (the first capacitance) formed between the electrode E and the object. The CV conversion circuit transfers and stores an electric charge transmitted in the electrode E along with the charge or discharge (or an electric charge proportional to the aforementioned electric charge) to and in a reference capacitor, and outputs a signal corresponding to a voltage generated in the reference capacitor. The A/D conversion circuit converts the output signal of the CV conversion circuit into a digital signal every predetermined period and outputs the digital signal as detection data under control of the processing unit 20.

In the following description, it is assumed that the detection data output from the capacitance detection part 12 in accordance with the capacitance (the first capacitance) between the electrode $E_i$ and the object is "$S_i$" ($1 \leq i \leq n$). The capacitance detection part 12 outputs a number n of detection data $S_1$ to $S_n$ corresponding to the number n of electrodes $E_1$ to $E_n$.

Processing Unit 20

The processing unit 20 is a circuit that controls entire operation of the input device. For example, the processing unit 20 includes a computer that executes processing according to a command code of a program stored in the storage unit 30, and/or a logic circuit that realizes a specific function. The processing of the processing unit 20 may be entirely realized by the computer on the basis of the program, or may be partially or entirely realized by a dedicated logic circuit.

In the example in FIG. 1, the processing unit 20 includes a timing control part 21, an element data configuration part 22, and a coordinate calculation part 23.

The timing control part 21 controls the timing of the detection by the sensor unit 10. To be specific, the timing control part 21 controls the capacitance detection part 12 so that selection of an electrode E to be detected and generation of a pulse voltage, sampling of an electric charge, and generation of detection data by A/D conversion in the capacitance detection part 12 are executed at proper timings.

The element data configuration part 22 configures a number m of element data $P_1$ to $P_m$ corresponding to capacitances between electrodes E and an object in the number m of segments $A_1$ to $A_m$, on the basis of the number n of detection data $S_1$ to $S_n$ output from the capacitance detection part 12.

That is, the element data configuration part 22 configures element data $P_j$ corresponding to a third capacitance $CA_j$ obtained by combining a second capacitance $CE_{ij}$ formed between an overlapping portion of at least one electrode E located in one segment A and an object, for each of the number m of segments $A_1$ to $A_m$.

Information relating to the area ratio of an overlapping portion $E_{ij}$ of an individual electrode $E_i$ located in the same segment $A_j$ to all the overlapping portions (constant data $K_{ij}$) in each of the number m of segments $A_1$ to $A_m$ is known information determined in accordance with the arrangement pattern of the number n of electrodes $E_1$ to $E_n$. The element data configuration part 22 configures the number m of element data $P_1$ to $P_m$ corresponding the number m of segments $A_1$ to $A_m$, on the basis of the known information relating to the area ratio and the number n of detection data $S_1$ to $S_n$ output from the capacitance detection part 12.

Figure 2:
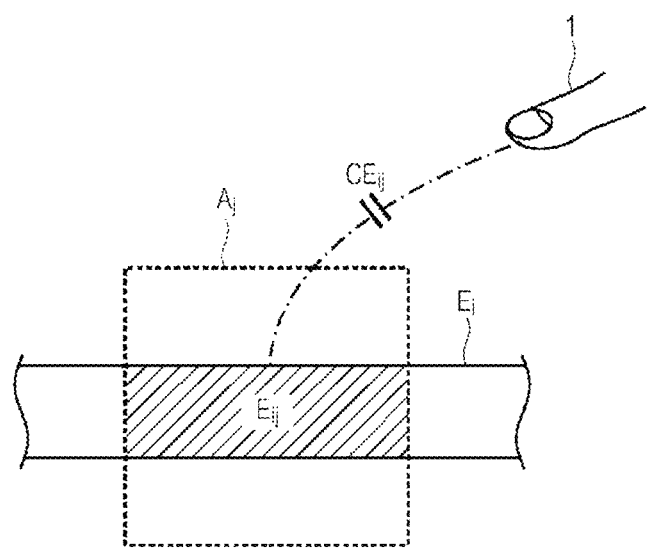
FIG. 2 is an illustration graphically explaining an overlapping portion of one electrode in one segment, and a capacitance formed between the overlapping portion and a finger.

FIG. 2 is an illustration graphically explaining an overlapping portion $E_{ij}$ of an electrode $E_i$ in a segment A, and a capacitance $CE_{ij}$ formed between the overlapping portion $E_{ij}$ and an object. "$E_{ij}$" in FIG. 2 represents an overlapping portion of the electrode $E_i$ with respect to the segment $A_j$. Also, "$CE_{ij}$" represents a capacitance (a second capacitance) formed between the overlapping portion $E_{ij}$ of the electrode $E_i$ and an object 1 such as a finger.

In a case where a capacitance formed between all overlapping portions of electrodes E included in a segment $A_j$ and an object 1 is a "third capacitance $CA_j$," a change $\Delta CA_j$ in the third capacitance $CA_j$ is substantially equivalent to a value obtained by adding second capacitance changes $\Delta CE_{ij}$ of the respective electrodes in the segment $A_j$. Hence, the change $\Delta CA_j$ in the third capacitance $CA_j$ is expressed by the following expression.

$$\Delta CA_j = \sum_{i=1}^{n} \Delta CE_{ij} \qquad (1)$$

In Expression (1), if the segment and the electrode $E_i$ do not have an overlapping portion, the second capacitance change $\Delta CE_{ij}$ is set at zero.

If a capacitance formed between an electrode $E_i$ and an object is a "first capacitance $CE_i$," a change $\Delta CE_i$ in the first capacitance $CE_i$ is substantially equivalent to a value obtained by adding changes $\Delta CE_{ij}$ of second capacitances of all overlapping portions $E_{ij}$ belonging to the electrode $E_1$. Hence the change $\Delta CE_i$ in the first capacitance $CE_i$ is expressed by the following expression.

$$\Delta CE_i = \sum_{j=1}^{m} \Delta CE_{ij} \qquad (2)$$

A second capacitance $CE_{ij}$ formed between one overlapping portion $E_{ij}$ and an object is substantially proportional to the area of the overlapping portion $E_{ij}$. Also, a third capacitance $CA_j$ (Expression (1)) formed between all overlapping portions of electrodes E included in a segment $A_j$ and an object 1 is substantially proportional to the area of the overlapping portions of all electrodes E included in the area $A_j$. Hence, known constant data $K_{ij}$ relating to the area ratio between an overlapping portion $E_{ij}$ of one electrode $E_i$ and all overlapping portions located in the same segment represents the ratio between the second capacitance change $\Delta CE_{ij}$ and the third capacitance change $\Delta CA_j$ as expressed by the following expression.

$$K_{ij} = \frac{\Delta CE_{ij}}{\Delta CA_j} \qquad (3)$$

Using the relationship in Expression (3), Expression (2) is expressed by the following expression.

$$\Delta CE_i = \sum_{j=1}^{m} K_{ij} \Delta CA_j \qquad (4)$$

Using a matrix, Expression (4) is expressed by the following expression.

$$\underbrace{\begin{bmatrix} K_{11} & K_{12} & \cdots & K_{1m} \\ K_{21} & & & K_{2m} \\ \vdots & & & \vdots \\ K_{n1} & K_{n2} & \cdots & K_{nm} \end{bmatrix}}_{K} \begin{bmatrix} \Delta CA_1 \\ \Delta CA_2 \\ \vdots \\ \Delta CA_m \end{bmatrix} = \begin{bmatrix} \Delta CE_1 \\ \Delta CE_2 \\ \vdots \\ \Delta CE_n \end{bmatrix} \qquad (5)$$

If it is assumed that the detection data $S_1$ to $S_n$ are proportional to first capacitance changes $\Delta CE_1$ to $\Delta CE_n$, and the element data $P_1$ to $P_m$ are proportional to third capacitance changes $\Delta CA_1$ to $\Delta CA_m$, Expression (5) may be rewritten as the following expression.

$$\begin{bmatrix} K_{11} & K_{12} & \cdots & K_{1m} \\ K_{21} & & & K_{2m} \\ \vdots & & & \vdots \\ K_{n1} & K_{n2} & \cdots & K_{nm} \end{bmatrix} \begin{bmatrix} P_1 \\ P_2 \\ \vdots \\ P_m \end{bmatrix} = \begin{bmatrix} S_1 \\ S_2 \\ \vdots \\ S_n \end{bmatrix} \qquad (6)$$

An n×m matrix (a first transformation matrix K) in the left term of Expression (6) is known information determined in accordance with the arrangement pattern of the number n of electrodes $E_1$ to $E_n$.

In this case, it is assumed that provisional values of the number m of element data $P_1$ to $P_m$ are "provisional element data $PA_1$ to $PA_m$," and provisional values of the number n of detection data $S_1$ to $S_n$ are "provisional detection data $SA_1$ to $SA_n$." The provisional detection data $SA_1$ to $SA_n$ are expressed by the following expression by using the first transformation matrix K and the provisional element data $PA_1$ to $PA_m$, similarly to Expression (6).

$$\begin{bmatrix} K_{11} & K_{12} & \cdots & K_{1m} \\ K_{21} & & & K_{2m} \\ \vdots & & & \vdots \\ K_{n1} & K_{n2} & \cdots & K_{nm} \end{bmatrix} \begin{bmatrix} PA_1 \\ PA_2 \\ \vdots \\ PA_m \end{bmatrix} = \begin{bmatrix} SA_1 \\ SA_2 \\ \vdots \\ SA_n \end{bmatrix} \qquad (7)$$

The element data configuration part 22 repeats data configuration processing of correcting the number m of provisional element data $PA_1$ to $PA_m$ on the basis of the known information (the constant data $K_{ij}$) so that the number n of provisional detection data $SA_1$ to $SA_n$ calculated as Expression (7) from the number m of provisional element data $PA_1$ to $PA_m$ on the basis of the known information (the first transformation matrix K) approach the number n of detection data $S_1$ to $S_n$ output from the capacitance detection part 12.

The data configuration processing repetitively executed for correcting the number m of provisional element data $PA_1$ to $PA_m$ includes, specifically, four processing (first processing to fourth processing).

First, in the first processing, the element data configuration part 22 transforms the number m of provisional element data $PA_1$ to $PA_m$ into the number n of provisional detection data $SA_1$ to $SA_n$ on the basis of the known information (the first transformation matrix K) (Expression (7)).

Then, in the second processing, the element data configuration part 22 calculates first coefficients $\alpha_1$ to $\alpha_n$ representing multiplying factors by which the provisional detection data $SA_1$ to $SA_n$ are multiplied to cause the provisional detection data $SA_1$ to $SA_n$ to be equivalent to the detection data $S_1$ to $S_n$. A first coefficient $\alpha_i$ is expressed by the following expression.

$$\alpha_i = \frac{S_i}{SA_i} \qquad (8)$$

Calculation for the first coefficients $\alpha_1$ to $\alpha_n$ in the second processing is expressed as the following expression by using a matrix.

$$\begin{bmatrix} \alpha_1 \\ \alpha_2 \\ \vdots \\ \alpha_n \end{bmatrix} = \begin{bmatrix} S_1/SA_1 \\ S_2/SA_2 \\ \vdots \\ S_n/SA_n \end{bmatrix} \qquad (9)$$

Then, in the third processing, the element data configuration part 22 calculates a number m of second coefficients $\beta_1$ to $\beta_m$ representing multiplying factors by which the number m of provisional element data $PA_1$ to $PA_m$ are multiplied. The element data configuration part 22 transforms the number n of first coefficients $\alpha_1$ to $\alpha_n$ into the number m of second coefficients $\beta_1$ to $\beta_m$ on the basis of the known information (the constant data $K_{ij}$) determined in accordance with the segment pattern and the electrode pattern.

From the relation in Expression (3), the second capacitance $CE_{ij}$ of an overlapping portion $E_{ij}$ of an electrode $E_i$ in one segment $A_j$ has a ratio equivalent to the constant data $K_{ij}$ with respect to the entire third capacitance $CA_j$ of the segment $A_j$. Hence, it can be expected that the multiplying factor by which element data $P_j$ (a third capacitance $CA_j$) of a segment $A_j$ is multiplied has a contribution proportional to the constant data $K_{ij}$ with respect to detection data $S_i$ (a first capacitance $CE_i$) of an electrode $E_1$. Accordingly, the second coefficient $\beta_1$ in one segment $A_j$ can be approximated to a value obtained by assigning a weight of the constant data $K_{ij}$ to a first coefficient $\alpha_i$ of each electrode $E_i$ and averaging the result. The second coefficient $\beta_j$ is expressed by the following expression with this approximation.

$$\beta_j = \frac{\sum_{i=1}^{n} K_{ij} \alpha_i}{\sum_{i=1}^{n} K_{ij}} = \sum_{i=1}^{n} K_{ij} \alpha_i \qquad (10)$$

Using a matrix, Expression (10) is expressed by the following expression.

$$\underbrace{\begin{bmatrix} K_{11} & K_{21} & \cdots & K_{n1} \\ K_{12} & & & K_{n2} \\ \vdots & & & \vdots \\ K_{1m} & K_{2m} & \cdots & K_{nm} \end{bmatrix}}_{K^T} \begin{bmatrix} \alpha_1 \\ \alpha_2 \\ \vdots \\ \alpha_n \end{bmatrix} = \begin{bmatrix} \beta_1 \\ \beta_2 \\ \vdots \\ \beta_m \end{bmatrix} \quad (11)$$

An m×n matrix (a second transformation matrix) in the left term of Expression (11) is known information determined in accordance with the arrangement pattern of the number n of electrodes $E_1$ to $E_n$, and is a transposed matrix of the first transformation matrix K (Expression (5)).

Then, in the fourth processing, the element data configuration part 22 corrects the current provisional element data $PA_1$ to $PA_m$ to new provisional element data $PA'_1$ to $PA'_m$ on the basis of the number m of second coefficients $\beta_1$ to $\beta_m$ acquired in the third processing.

$$PA'_j = \beta_j PA_j \quad (12)$$

Calculation for the provisional element data $PA'_1$ to $PA'_m$ in the fourth processing is expressed as the following expression by using a matrix.

$$\begin{bmatrix} PA'_1 \\ PA'_2 \\ \vdots \\ PA'_m \end{bmatrix} = \begin{bmatrix} \beta_1 PA_1 \\ \beta_2 PA_2 \\ \vdots \\ \beta_m PA_m \end{bmatrix} \quad (13)$$

The above description is for the element data configuration part 22.

The coordinate calculation part 23 calculates the coordinates on the operation surface that the object (the finger) approaches, on the basis of the element data $P_1$ to $P_m$ configured by the element data configuration part 22. For example, the coordinate calculation part 23 binarizes the two-dimensional data represented by the element data $P_1$ to $P_m$, and specifies a region in which data representing the approach of the object is gathered, as an individual object approach region. Then, the coordinate calculation part 23 creates profile data for each of the transverse direction and the longitudinal direction of the specified region. The transverse-direction profile data is obtained by calculating the sum of a group of element data $P_j$ in the longitudinal direction of the operation surface for each column, and arranging the sum of the element data $P_j$ sequentially in the order in the transverse direction of the operation surface. The longitudinal-direction profile data is obtained by calculating the sum of a group of element data $P_j$ in the transverse direction of the operation surface for each row, and arranging the sum of the element data $P_j$ sequentially in the order in the longitudinal direction of the operation surface. The coordinate calculation part 23 calculates the position of a peak and the position of a barycenter of the element data $P_j$ for each of the transverse-direction profile data and the longitudinal-direction profile data. The position in the transverse direction and the position in the longitudinal direction obtained by this calculation represent the coordinates that the object approaches on the operation surface. The coordinate calculation part 23 stores the data on the coordinates obtained by such calculation in a predetermined storage area of the storage unit 30.

Storage Unit 30

The storage unit 30 stores constant data and variable data to be used in the processing in the processing unit 20. If the processing unit 20 includes a computer, the storage unit 30 may store a program that is executed in the computer. the storage unit 30 is configured to include a volatile memory, such as DRAM or SRAM, a non-volatile memory such as a flash memory, a hard disk, etc.

Interface Unit 40

The interface unit 40 is a circuit for exchanging data between the input device and another control device (for example, a control IC of an information apparatus in which the input device is installed). The processing unit 20 outputs information (coordinate information of an object, the number of objects, etc.) to be stored in the storage unit 30 to a control device (not shown) through the interface unit 40. Also, the interface unit 40 may acquire a program that is executed in the computer of the processing unit 20, from a disk drive device (not shown) (a device of reading a program recorded in a non-temporary recording medium), or a server, and may load the program in the storage unit 30.

Operation of the input device shown in FIG. 1 and having the aforementioned configuration is described with reference to a flowchart in FIG. 3. For example, the input device repeats operation shown in the flowchart in FIG. 3 every constant period, and acquires information on an approach position of an object on the operation surface.

ST100:

The processing unit 20 acquires detection data $S_1$ to $S_n$ representing first capacitance changes $\Delta CE_i$ of the respective electrodes E on the operation surface, from the capacitance detection part 12 of the sensor unit 10.

ST105:

The processing unit 20 determines whether or not the detection data $S_1$ to $S_n$ acquired in step ST100 exceed a predetermined threshold representing an approach of an object with respect to the operation surface. If detection data $S_i$ exceeding the threshold is included, the processing unit 20 shifts the processing to next step ST110. If detection data $S_i$ exceeding the threshold is not included, the processing unit 20 ends the processing.

ST110:

The element data configuration part 22 of the processing unit 20 configures a number m of element data $P_1$ to $P_m$ on the basis of the number n of detection data $S_1$ to $S_n$ acquired in step ST100.

ST115:

The coordinate calculation part 23 of the processing unit 20 calculates the coordinates of each object approaching the operation surface on the basis of the number m of element data $P_1$ to $P_m$ configured in step ST110.

Figure 3:
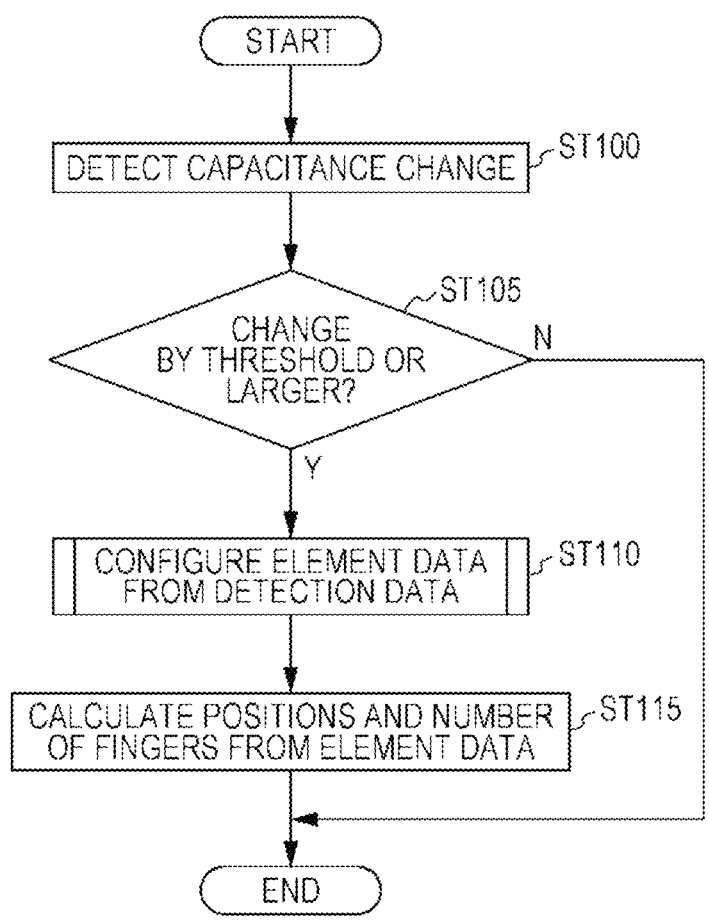
FIG. 3 is a flowchart for describing an example operation of the input device shown in FIG. 1.
Figure 4:
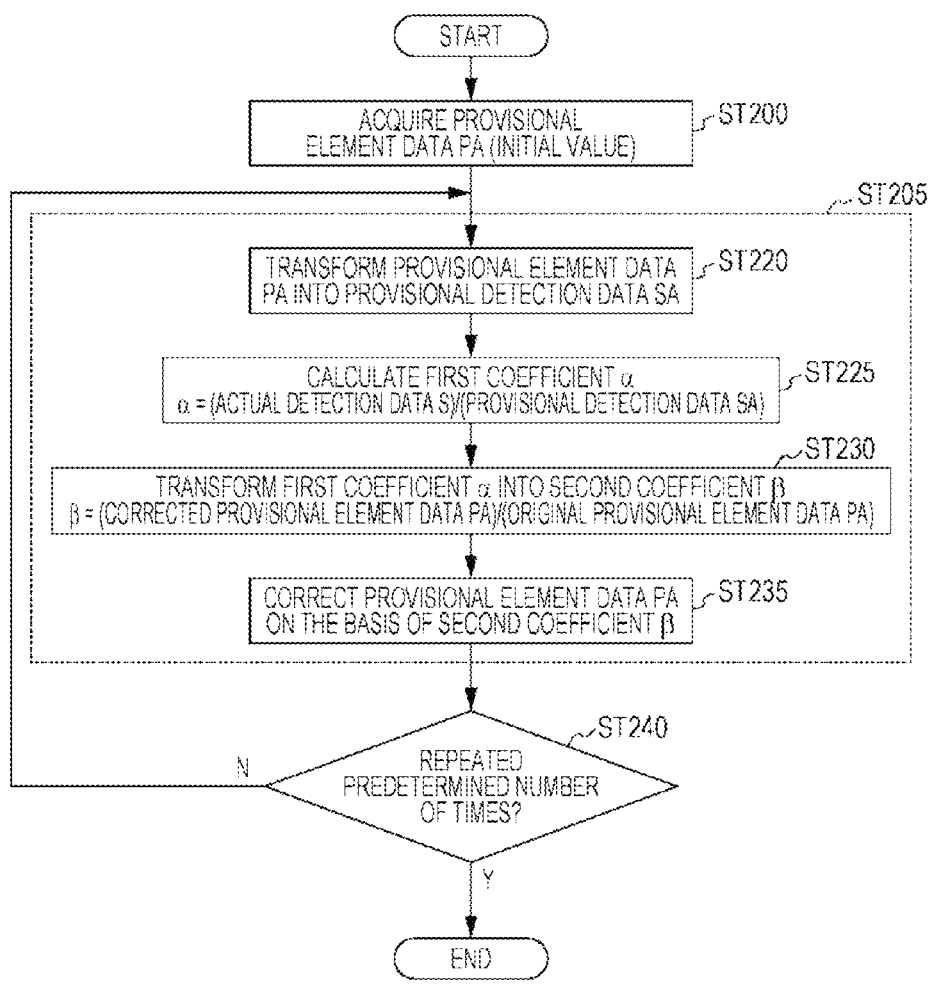
FIG. 4 is a flowchart for describing configuration processing for element data in the flowchart shown in FIG. 3.

FIG. 4 is a flowchart for describing the configuration processing for the element data $P_1$ to $P_m$ (ST110) in the flowchart shown in FIG. 3.

ST200:

The element data configuration part 22 acquires initial values of provisional element data $PA_1$ to $PA_m$ that are used in loop processing (described later). The element data configuration part 22 acquires, for example, constant data previously stored in the storage unit 30, as the initial values.

ST205:

By using the initial values acquired in step ST200, the element data configuration part 22 repeats processing (data configuration processing) of correcting the provisional element data $PA_1$ to $PA_m$ so that provisional detection data $SA_1$ to $SA_n$ calculated from the provisional element data $PA_1$ to PA$_m$ approach the detection data S$_1$ to S$_n$. The data configuration processing in step ST205 includes four steps (ST220, ST225, ST230, ST235).

First, in step ST220, the element data configuration part 22 transforms the provisional element data PA$_1$ to PA$_m$ into the provisional detection data SA$_1$ to SA$_n$ on the basis of known information (a first transformation matrix K) (Expression (7)).

Then, in step ST225, the element data configuration part 22 calculates first coefficients $\alpha_1$ to $\alpha_n$ representing multiplying factors by which the provisional detection data SA$_1$ to SA$_n$ are multiplied to cause the provisional detection data SA$_1$ to SA$_n$ to be equivalent to the detection data S$_1$ to S$_n$ (Expression (8), Expression (9)).

Further, in step ST230, the element data configuration part 22 transforms the number n of first coefficients $\alpha_1$ to $\alpha_n$ into a number m of second coefficients $\beta_1$ to $\beta_m$ representing multiplying factors by which the number m of provisional element data PA$_1$ to PA$_m$ are multiplied, on the basis of known information (a second transformation matrix K$^T$) (Expression (10), Expression (11)).

Then, in step ST235, the element data configuration part 22 transforms the current provisional element data PA$_1$ to PA$_m$ into new provisional element data PA'$_1$ to PA'$_m$ on the basis of the number m of second coefficients $\beta_1$ to $\beta_m$ acquired in step ST230 (Expression (12), Expression (13)).

ST240:

When the data configuration processing (ST205) is completed, the element data configuration part 22 checks the current number of repetition times. If the number of repetition times does not reach a predetermined number of times, the element data configuration part 22 repeats the data configuration processing (ST205) again. If the number of repetition times reaches the predetermined number of times, the element data configuration part 22 determines the provisional element data PA$_1$ to PA$_m$ corrected by the last data configuration processing (ST205) as normal element data P$_1$ to P$_m$, and stores the normal element data P$_1$ to P$_m$ in the predetermined storage area of the storage unit 30.

Described next is a further specific example of processing of configuring the element data P$_1$ to P$_m$ from the detection data S$_1$ to S$_n$ in the input device according to this embodiment, with reference to FIGS. 5A to 7.

Figure 5A:
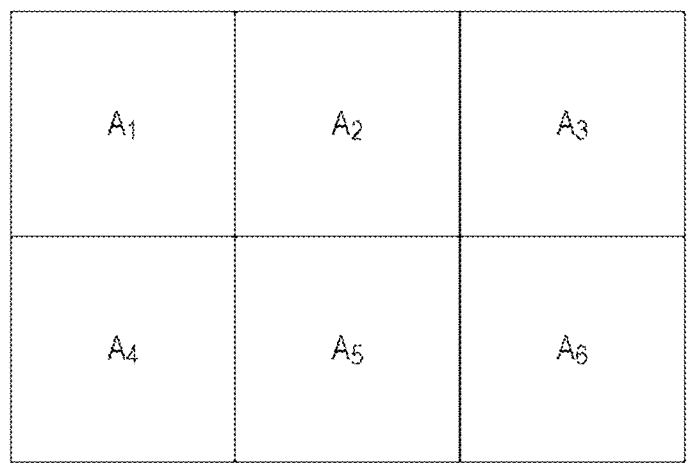
FIGS. 5A and 5B provide illustrations showing examples of a segment pattern and an electrode pattern on an operation surface of a sensor unit, FIG. 5A showing the segment pattern, FIG. 5B showing the electrode pattern.

FIG. 5A is an illustration showing an example of a segment pattern set on the operation surface of the sensor unit 10.

In the example in FIG. 5A, six segments A$_1$ to A$_6$ are set with a matrix-like pattern. This matrix pattern has two rows in the longitudinal direction and three columns in the transverse direction. In this example, 2×3 element data P$_1$ to P$_6$ corresponding to the 2×3 segments A$_1$ to A$_6$ are configured.

Figure 5B:
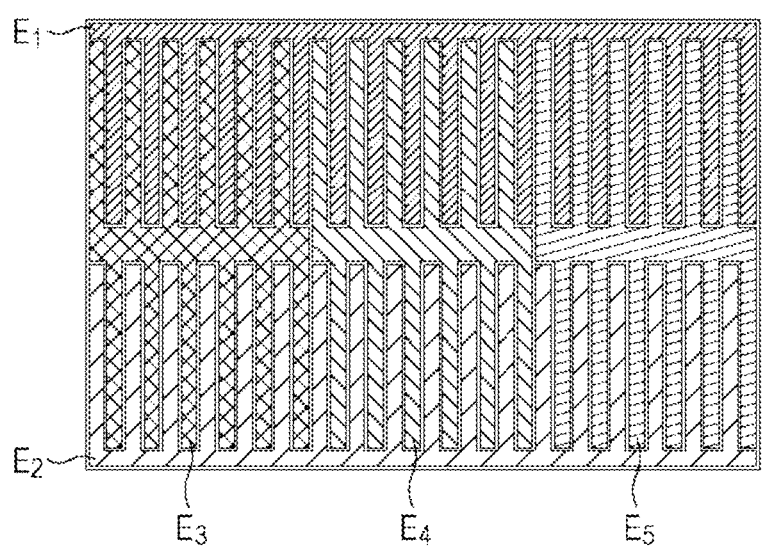

FIG. 5B is an illustration showing an example of an electrode pattern arranged on the operation surface of the sensor unit 10.

In the example in FIG. 5B, five electrodes E$_1$ to E$_5$ are arranged in the 2×3 matrix-like segment pattern. The electrode E$_1$ extends over the three segments A$_1$ to A$_3$ in the transverse direction. The electrode E$_2$ extends over the three segments A$_4$ to A$_6$ in the transverse direction. The electrode E$_3$ extends over the two segments A$_1$ and A$_4$ in the longitudinal direction. The electrode E$_4$ extends over the two segments A$_2$ and A$_5$ in the longitudinal direction. The electrode E$_5$ extends over the two segments A$_3$ and A$_6$ in the longitudinal direction.

Also, in the example in FIG. 5B, the area occupied by one electrode E$_i$ (1≤i≤5) in one segment A$_j$ (1≤j≤6) is ½ of the area of all electrodes in the segment A$_j$. That is, each segment A is occupied by two electrodes E by ½ each.

FIGS. 6A to 6E provide illustrations graphically explaining the individual electrodes E$_1$ to E$_5$ with the electrode pattern shown in FIG. 5B.

As shown in FIGS. 6A to 6E, a plurality of electrode pieces EP extending in the longitudinal direction are provided in a comb-like shape at overlapping portions of the respective electrodes E. Each of the plurality of electrode pieces EP located in the same segment A is adjacent to an electrode piece EP of a different electrode E. That is, in the segment A, the electrodes E are arranged to be uniformly distributed. Accordingly, the ratio (Expression (3)) between a capacitance (a second capacitance) of an overlapping portion of each electrode E included in the segment A and a capacitance (a third capacitance) of overlapping portions of all electrodes included in the segment A is less likely varied in accordance with the approach position of an object in the segment A, and hence accuracy of element data P$_j$ to be configured can be increased.

In the examples shown in FIGS. 5A, 5B, and 6, since the area of one overlapping portion E$_{ij}$ included in a segment A$_j$ is substantially ½ of the area of all electrodes in the segment A$_j$, a second capacitance change $\Delta CE_{ij}$ in the overlapping portion E$_{ij}$ is substantially ½ of a third capacitance change $\Delta CA_j$ of all electrodes in the segment A. That is, in a segment A in which an overlapping portion E$_{ij}$ of an electrode E$_i$ is present, the value of the constant data K$_{ij}$ expressed in Expression (3) is "½."

Figure 6A:
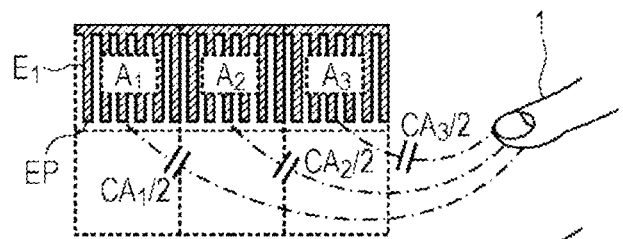
FIGS. 6A to 6E provide illustrations graphically explaining individual five electrodes shown in the examples in FIGS. 5A and 5B.

Hence, the first capacitance change $\Delta CE$ of the electrode E$_1$ is substantially equivalent to the sum of ½ of each of the third capacitance changes $\Delta CA_1$ to $\Delta CA_3$ in the segments A$_1$ to A$_3$ (FIG. 6A).

Figure 6B:
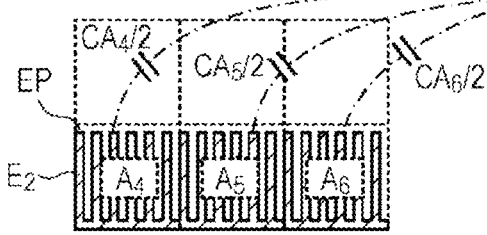

Also, the first capacitance change $\Delta CE_2$ of the electrode E$_2$ is substantially equivalent to the sum of ½ of each of the third capacitance changes $\Delta CA_4$ to $\Delta CA_6$ in the segments A$_4$ to A$_6$ (FIG. 6B).

Figure 6C:
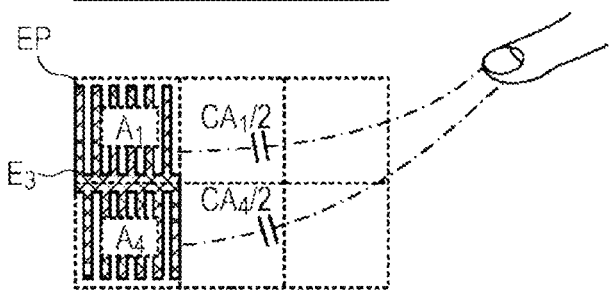

Similarly, the first capacitance change $\Delta CE_3$ of the electrode E$_3$ is substantially equivalent to the sum of ½ of each of the third capacitance changes $\Delta CA_1$ and $\Delta CA_4$ in the segments A$_1$ and A$_4$ (FIG. 6C).

Figure 6D:
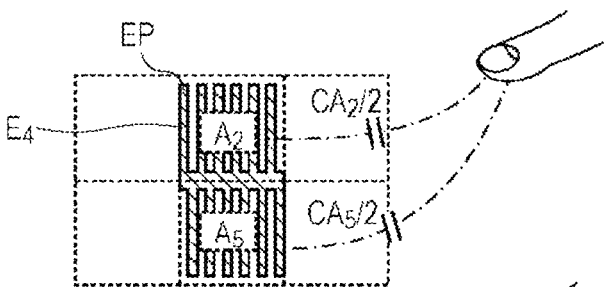

The first capacitance change $\Delta CE_4$ of the electrode E$_4$ is substantially equivalent to the sum of ½ of each of the third capacitance changes $\Delta CA_2$ and $\Delta CA_5$ in the segments A$_2$ and A$_5$ (FIG. 6D).

Figure 6E:
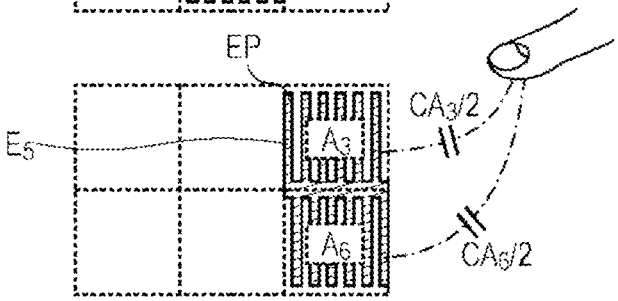

The first capacitance change $\Delta CE_5$ of the electrode E$_5$ is substantially equivalent to the sum of ½ of each of the third capacitance changes $\Delta CA_3$ and $\Delta CA_6$ in the segments A$_3$ and A$_6$ (FIG. 6E).

In short, the relation is expressed by the following expressions.

$$\Delta CE_1 = \frac{\Delta CA_1 + \Delta CA_2 + \Delta CA_3}{2} \qquad (14\text{-}1)$$

$$\Delta CE_2 = \frac{\Delta CA_4 + \Delta CA_5 + \Delta CA_6}{2} \qquad (14\text{-}2)$$

$$\Delta CE_3 = \frac{\Delta CA_1 + \Delta CA_4}{2} \qquad (14\text{-}3)$$

$$\Delta CE_4 = \frac{\Delta CA_2 + \Delta CA_5}{2} \qquad (14\text{-}4)$$

$$\Delta CE_5 = \frac{\Delta CA_3 + \Delta CA_6}{2} \qquad (14\text{-}5)$$

When Expressions (14-1) to (14-5) are rewritten as a matrix, the matrix is as follows.

$$\underbrace{\begin{bmatrix} \frac{1}{2} & \frac{1}{2} & \frac{1}{2} & 0 & 0 & 0 \\ 0 & 0 & 0 & \frac{1}{2} & \frac{1}{2} & \frac{1}{2} \\ \frac{1}{2} & 0 & 0 & \frac{1}{2} & 0 & 0 \\ 0 & \frac{1}{2} & 0 & 0 & \frac{1}{2} & 0 \\ 0 & 0 & \frac{1}{2} & 0 & 0 & \frac{1}{2} \end{bmatrix}}_{K} \begin{bmatrix} \Delta CA_1 \\ \Delta CA_2 \\ \Delta CA_3 \\ \Delta CA_4 \\ \Delta CA_5 \\ \Delta CA_6 \end{bmatrix} = \begin{bmatrix} \Delta CE_1 \\ \Delta CE_2 \\ \Delta CE_3 \\ \Delta CE_4 \\ \Delta CE_5 \end{bmatrix} \quad (15)$$

If it is assumed that the detection data $S_1$ to $S_5$ are proportional to the first capacitance changes $\Delta CE_1$ to $\Delta CE_5$, and the element data $P_1$ to $P_6$ are proportional to the third capacitance changes $\Delta CA_1$ to $\Delta CA_6$, Expression (15) may be rewritten as the following expression.

$$\begin{bmatrix} \frac{1}{2} & \frac{1}{2} & \frac{1}{2} & 0 & 0 & 0 \\ 0 & 0 & 0 & \frac{1}{2} & \frac{1}{2} & \frac{1}{2} \\ \frac{1}{2} & 0 & 0 & \frac{1}{2} & 0 & 0 \\ 0 & \frac{1}{2} & 0 & 0 & \frac{1}{2} & 0 \\ 0 & 0 & \frac{1}{2} & 0 & 0 & \frac{1}{2} \end{bmatrix} \begin{bmatrix} P_1 \\ P_2 \\ P_3 \\ P_4 \\ P_5 \\ P_6 \end{bmatrix} = \begin{bmatrix} S_1 \\ S_2 \\ S_3 \\ S_4 \\ S_5 \end{bmatrix} \quad (16)$$

Expressions (15) and (16) correspond to aforementioned Expressions (5) and (6). A 5×6 matrix (a first transformation matrix K) in the left term of each of Expressions (15) and (16) is determined in accordance with the segment pattern and the electrode pattern shown in FIGS. 5A and 5B. The simultaneous equation in Expression (16) has a larger number of variables than that of an equation, and hence a solution cannot be easily obtained by an inverse matrix.

As a specific example of processing, in a case where values of element data $P_1$, $P_2$, ..., and $P_6$ are "1," "2," ..., and "6," processing of configuring element data $P_1$, $P_2$, ..., $P_6$ from detection data $S_1$, $S_2$, ..., and $S_5$ by the flow shown in FIG. 4 is described.

In this case, the detection data $S_1$, $S_2$, ..., and $S_5$ are calculated as the following expression.

$$\begin{bmatrix} \frac{1}{2} & \frac{1}{2} & \frac{1}{2} & 0 & 0 & 0 \\ 0 & 0 & 0 & \frac{1}{2} & \frac{1}{2} & \frac{1}{2} \\ \frac{1}{2} & 0 & 0 & \frac{1}{2} & 0 & 0 \\ 0 & \frac{1}{2} & 0 & 0 & \frac{1}{2} & 0 \\ 0 & 0 & \frac{1}{2} & 0 & 0 & \frac{1}{2} \end{bmatrix} \begin{bmatrix} 1 \\ 2 \\ 3 \\ 4 \\ 5 \\ 6 \end{bmatrix} = \begin{bmatrix} S_1 \\ S_2 \\ S_3 \\ S_4 \\ S_5 \end{bmatrix} = \begin{bmatrix} 3 \\ 7.5 \\ 2.5 \\ 3.5 \\ 4.5 \end{bmatrix} \quad (17)$$

The element data configuration part 22 configures the six element data $P_1$ to $P_6$ on the basis of the five detection data $S_1$ to $S_5$ and known information (the 5×6 first transformation matrix K) determined in accordance with the segment pattern and the electrode pattern shown in FIGS. 5A and 5B.

First, the element data configuration part 22 transforms initial values of provisional element data $PA_1$ to $PA_6$ acquired in step ST200 into provisional detection data $SA_1$ to $SA_5$ (ST220). If all the initial values of the provisional element data $PA_1$ to $PA_6$ are "1," the provisional detection data $SA_1$ to $SA_5$ in first loop processing are calculated as the following expression.

$$\begin{bmatrix} \frac{1}{2} & \frac{1}{2} & \frac{1}{2} & 0 & 0 & 0 \\ 0 & 0 & 0 & \frac{1}{2} & \frac{1}{2} & \frac{1}{2} \\ \frac{1}{2} & 0 & 0 & \frac{1}{2} & 0 & 0 \\ 0 & \frac{1}{2} & 0 & 0 & \frac{1}{2} & 0 \\ 0 & 0 & \frac{1}{2} & 0 & 0 & \frac{1}{2} \end{bmatrix} \begin{bmatrix} 1 \\ 1 \\ 1 \\ 1 \\ 1 \\ 1 \end{bmatrix} = \begin{bmatrix} 1.5 \\ 1.5 \\ 1 \\ 1 \\ 1 \end{bmatrix} = \begin{bmatrix} SA_1 \\ SA_2 \\ SA_3 \\ SA_4 \\ SA_5 \end{bmatrix} \quad (18)$$

Then, the element data configuration part 22 calculates first coefficients $\alpha_1$ to $\alpha_5$ representing multiplying factors by which the provisional detection data $SA_1$ to $SA_5$ are multiplied to cause the provisional detection data $SA_1$ to $SA_5$ to be equivalent to the actual detection data $S_1$ to $S_5$ (ST225). The first coefficients $\alpha_1$ to $\alpha_5$ are calculated as the following expressions.

$$\alpha_1 = \frac{S_1}{SA_1} = \frac{3}{1.5} = 2 \quad (19\text{-}1)$$

$$\alpha_2 = \frac{S_2}{SA_2} = \frac{7.5}{1.5} = 5 \quad (19\text{-}2)$$

$$\alpha_3 = \frac{S_3}{SA_3} = \frac{2.5}{1} = 2.5 \quad (19\text{-}3)$$

$$\alpha_4 = \frac{S_4}{SA_4} = \frac{3.5}{1} = 3.5 \quad (19\text{-}4)$$

$$\alpha_5 = \frac{S_5}{SA_5} = \frac{4.5}{1} = 4.5 \quad (19\text{-}5)$$

Further, the element data configuration part 22 calculates second coefficients $\beta_1$ to $\beta_6$ representing multiplying factors by which the provisional element data $PA_1$ to $PA_6$ are multiplied. That is, the element data configuration part 22 transforms the first coefficients $\alpha_1$ to $\alpha_5$ into the second coefficients $\beta_1$ to $\beta_6$ on the basis of the known information (the constant data $K_{ij}$) determined in accordance with the segment pattern and the electrode pattern.

All electrodes in the segment $A_1$ are divided into two of the electrode $E_1$ and the electrode $E_3$. Hence, if the third capacitance change $\Delta CA_1$ of all electrodes in the segment $A_1$ (the element data $P_1$) is multiplied by the second coefficient $\beta_1$, a substantially equivalent change is applied to each of the first capacitance change $\Delta CE_1$ of the electrode $E_1$ (the detection data $S_1$) and the first capacitance change $\Delta CE_3$ of the electrode $E_3$ (the detection data $S_3$). The first coefficient $\alpha_1$ of the electrode $E_1$ is calculated as "2" and the first coefficient $\alpha_3$ of the electrode $E_3$ is calculated as "2.5" from Expressions (19-1) and (19-3), and hence, the value of the second coefficient $\beta_1$ for causing the first coefficients $\alpha_1$ and $\alpha_3$ to approach the calculation values can be approximated to a value obtained by assigning the same weight to "2" of the first coefficient $\alpha_1$ and "2.5" of the first coefficient $\alpha_3$ and averaging the weighted values.

Similarly, the second coefficient $\beta_2$ can be approximated to the average value of the first coefficient $\alpha_1$ and the first coefficient $\alpha_4$. The second coefficient $\beta_3$ can be approximated to the average value of the first coefficient $\alpha_1$ and the first coefficient $\alpha_5$. The second coefficient $\beta_4$ can be approximated to the average value of the first coefficient $\alpha_2$ and the first coefficient $\alpha_3$. The second coefficient $\beta_5$ can be approximated to the average value of the first coefficient $\alpha_2$ and the first coefficient $\alpha_4$. The second coefficient $\beta_6$ can be approximated to the average value of the first coefficient $\alpha_2$ and the first coefficient $\alpha_5$.

In short, the relation is expressed as the following expressions.

$$\beta_1 = \frac{\alpha_1 + \alpha_3}{2} = \frac{2+2.5}{2} = 2.25 \tag{20-1}$$

$$\beta_2 = \frac{\alpha_1 + \alpha_4}{2} = \frac{2+3.5}{2} = 2.75 \tag{20-2}$$

$$\beta_3 = \frac{\alpha_1 + \alpha_5}{2} = \frac{2+4.5}{2} = 3.25 \tag{20-3}$$

$$\beta_4 = \frac{\alpha_2 + \alpha_3}{2} = \frac{5+2.5}{2} = 3.75 \tag{20-4}$$

$$\beta_5 = \frac{\alpha_2 + \alpha_4}{2} = \frac{5+3.5}{2} = 4.25 \tag{20-5}$$

$$\beta_6 = \frac{\alpha_2 + \alpha_5}{2} = \frac{5+4.5}{2} = 4.75 \tag{20-6}$$

When Expressions (20-1) to (20-6) are rewritten as a matrix, the matrix is as follows.

$$\begin{bmatrix} \beta_1 \\ \beta_2 \\ \beta_3 \\ \beta_4 \\ \beta_5 \\ \beta_6 \end{bmatrix} = \begin{bmatrix} \frac{1}{2} & 0 & \frac{1}{2} & 0 & 0 \\ \frac{1}{2} & 0 & 0 & \frac{1}{2} & 0 \\ \frac{1}{2} & 0 & 0 & 0 & \frac{1}{2} \\ 0 & \frac{1}{2} & \frac{1}{2} & 0 & 0 \\ 0 & \frac{1}{2} & 0 & \frac{1}{2} & 0 \\ 0 & \frac{1}{2} & 0 & 0 & \frac{1}{2} \end{bmatrix} \begin{bmatrix} \alpha_1 \\ \alpha_2 \\ \alpha_3 \\ \alpha_4 \\ \alpha_5 \end{bmatrix} \tag{21}$$

Expression (21) corresponds to aforementioned Expression (11). A 6×5 matrix (a second transformation matrix) in the right term of Expression (21) is obtained by transposing the 5×6 first transformation matrix in the left term of Expression (18). The second transformation matrix is also determined in accordance with the segment pattern and the electrode pattern shown in FIGS. 5A and 5B.

When the second coefficients $\beta_1$ to $\beta_6$ are obtained, the element data configuration part 22 calculates provisional element data $PA'_1$ to $PA'_m$ corrected by multiplying the current provisional element data $PA_1$ to $PA_6$ respectively by the second coefficients $\beta_1$ to $\beta_6$. The provisional element data $PA'_1$ to $PA'_m$ are calculated as the following expressions.

$$PA'_1 = \beta_1 * PA_1 = 2.25 \tag{22-1}$$

$$PA'_2 = \beta_2 * PA_2 = 2.75 \tag{22-2}$$

$$PA'_3 = \beta_3 * PA_3 = 3.25 \tag{22-3}$$

$$PA'_4 = \beta_4 * PA_4 = 3.75 \tag{22-4}$$

$$PA'_5 = \beta_5 * PA_5 = 4.25 \tag{22-5}$$

$$PA'_6 = \beta_6 * PA_6 = 4.75 \tag{22-6}$$

FIG. 7 is an illustration showing calculation values of the provisional element data $PA_1$ to $PA_6$ obtained by repeating the loop processing ten times in the above-described example. As it is found from the results, by repetitively executing the data configuration processing shown in FIG. 4, provisional element data PA approaches original data.

As described above, with the input device according to this embodiment, a second capacitance change $\Delta CE_{ij}$ (FIG. 2) formed between an overlapping portion $E_{ij}$ of one electrode $E_i$ located in one segment $A_j$ and an object is substantially proportional to the area of the overlapping portion $E_{ij}$. A third capacitance change $\Delta CA_j$ is obtained by combining second capacitance changes $\Delta CE_{ij}$ (Expression (1)), and hence, is substantially proportional to the area of overlapping portions of all electrodes located in one segment $A_j$. Accordingly, constant data $K_{ij}$ relating to the area ratio between an overlapping portion $E_{ij}$ of one electrode $E_i$ located in a segment $A_j$ and overlapping portions of all electrodes in the segment $A_j$ gives information relating to a capacitance ratio ($\Delta CE_{ij}/\Delta CA_j$) between the second capacitance change $\Delta CE_{ij}$ of one electrode $E_i$ in a segment $A_j$ and the third capacitance change $\Delta CA_j$.

Also, since a first capacitance change $\Delta CE_i$ formed between one electrode $E_i$ and an object is assumed as a value obtained by combining second capacitance changes $\Delta CE_{ij}$ between all overlapping portions belonging to one electrode $E_i$ and an object (Expression (2)), detection data $S_i$ having a value corresponding to the first capacitance change $CE_i$ gives information relating to a second capacitance change $\Delta CE_{ij}$ of an electrode $E_i$ in one or a plurality of segments A.

Also, electrodes $E_1$ to $E_n$ each have an overlapping portion in a different combination of segments A from that of another electrode E, or each have a different area of an overlapping portion included in the same segment A from that of another electrode E. Accordingly, detection data $S_1$ to $S_n$ obtained for the electrodes $E_1$ to $E_n$ provide independent information relating to the second capacitance changes $\Delta CE_{ij}$ of the respective electrodes $E_i$ in the segments $A_1$ to $A_m$.

The element data configuration part 22 configures element data $P_1$ to $P_m$ corresponding to third capacitance changes $\Delta CA_1$ to $\Delta CA_m$ of the segments $A_1$ to $A_m$ on the basis of the information relating to the second capacitance change $\Delta CE_{ij}$ of each segment $A_j$ and each electrode $E_i$ included in the detection data $S_1$ to $S_n$, and the information relating to the capacitance ratio ($\Delta CE_{ij}/\Delta CA_j$) of each segment $A_j$ and each electrode $E_i$ provided by the known constant data $K_{ij}$.

Accordingly, the number m of element data $P_1$ to $P_m$ representing the approach state with respect to an object in the number m of segments can be obtained by using the number n of electrodes $E_1$ to $E_n$ fewer than the number m of segments $A_1$ to $A_m$. Accordingly, data representing a two-dimensional distribution of capacitance on the operation surface can be acquired while the number of electrodes can be decreased as compared with the image sensing system of related art.

Since the number of electrodes is decreased, the circuit scale can be decreased. In addition, the scanning time and the number of times of scanning for capacitance detection in a constant sensing period can be increased and detection sensitivity for capacitance can be increased.

Also, since an electrode E is arranged over a plurality of segments A, the area of the electrode E is increased, and the detection sensitivity for capacitance can be increased.

Further, since the data representing the two-dimensional distribution of capacitance on the operation surface can be acquired, even when a plurality of objects approach the operation surface, ghost which may appear in the profile sensing system of related art is not generated, and the positions of the respective objects can be correctly detected.

Next, a modification of this embodiment is described.

Figure 8:
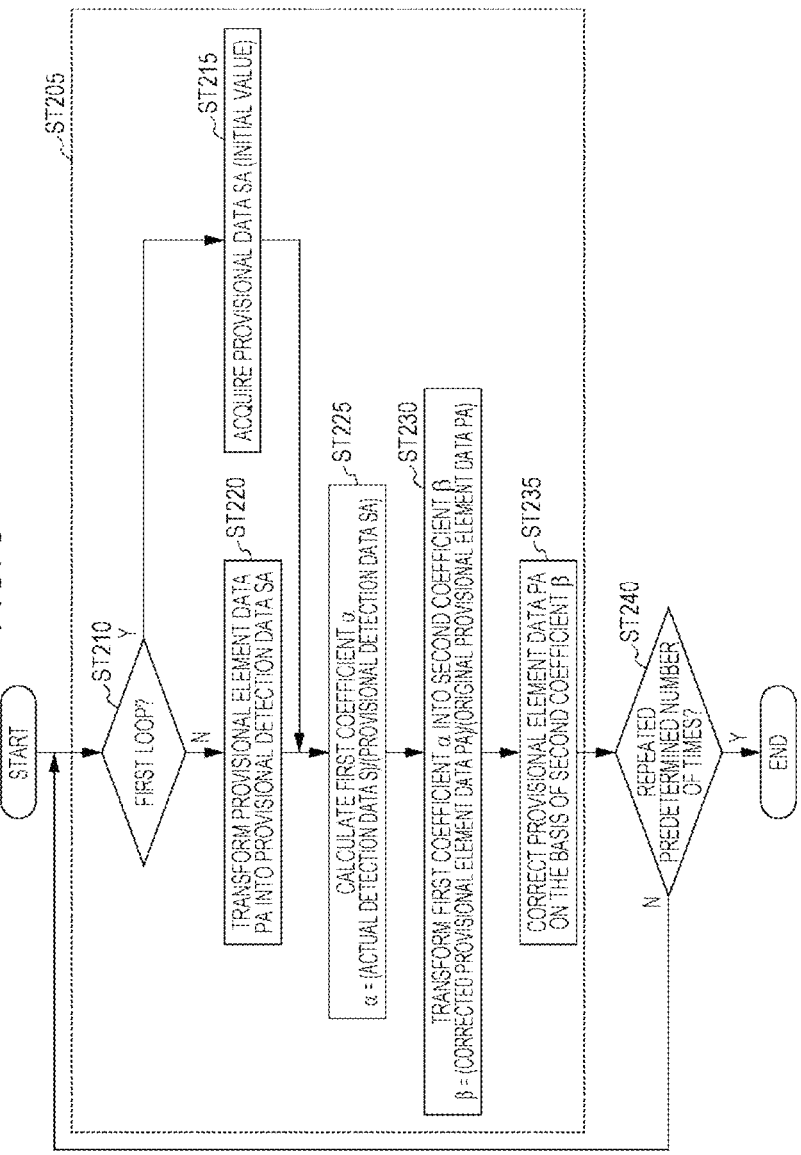
FIG. 8 is a flowchart for describing a modification of configuration processing for element data in an input device according to a first embodiment.

FIG. 8 is an illustration describing a modification of configuration processing for element data in the input device according to this embodiment.

In the example in FIG. 4, when the element data configuration part 22 executes first data configuration processing (ST205), the element data configuration part 22 calculates provisional detection data $SA_1$ to $SA_n$ from initial values of provisional element data $PA_1$ to $PA_m$ acquired in step ST200 (ST220). However, since the calculation results are normally constant regardless of the detection data $S_1$ to $S_n$, calculation does not have to be executed every time when the element data $P_1$ to $P_m$ are configured. Owing to this, in an example of a flowchart shown in FIG. 8, when the first data configuration processing (ST205) is executed, the calculation step for the provisional detection data $SA_1$ to $SA_n$ (ST220) is omitted.

That is, the element data configuration part 22 does not execute the calculation step for the provisional detection data $SA_1$ to $SA_n$ (ST220) when executing the first data configuration processing (ST205), and acquires predetermined initial values for the provisional detection data $SA_1$ to $SA_n$ from the storage unit 30 or the like (ST210, ST215). When the element data configuration part 22 executes the second data configuration processing (ST205), the element data configuration part 22 calculates provisional detection data $SA_1$ to $SA_n$ on the basis of the provisional element data $PA_1$ to $PA_m$ corrected by the previous data configuration processing in ST205 (ST220).

In this way, when the first data configuration processing (ST205) is executed, by omitting the calculation step for the provisional detection data $SA_1$ to $SA_n$ (ST220), the processing speed can be increased.

Second Embodiment

Next, a second embodiment of the present invention is described.

An input device according to this embodiment has a similar configuration to the configuration of the input device according to the first embodiment except for a different point in configuration processing for element data $P_1$ to $P_m$ in step ST110 (FIG. 3). Therefore, in the following description, the different point in the configuration processing for the element data $P_1$ to $P_m$ is mainly described.

Figure 9:
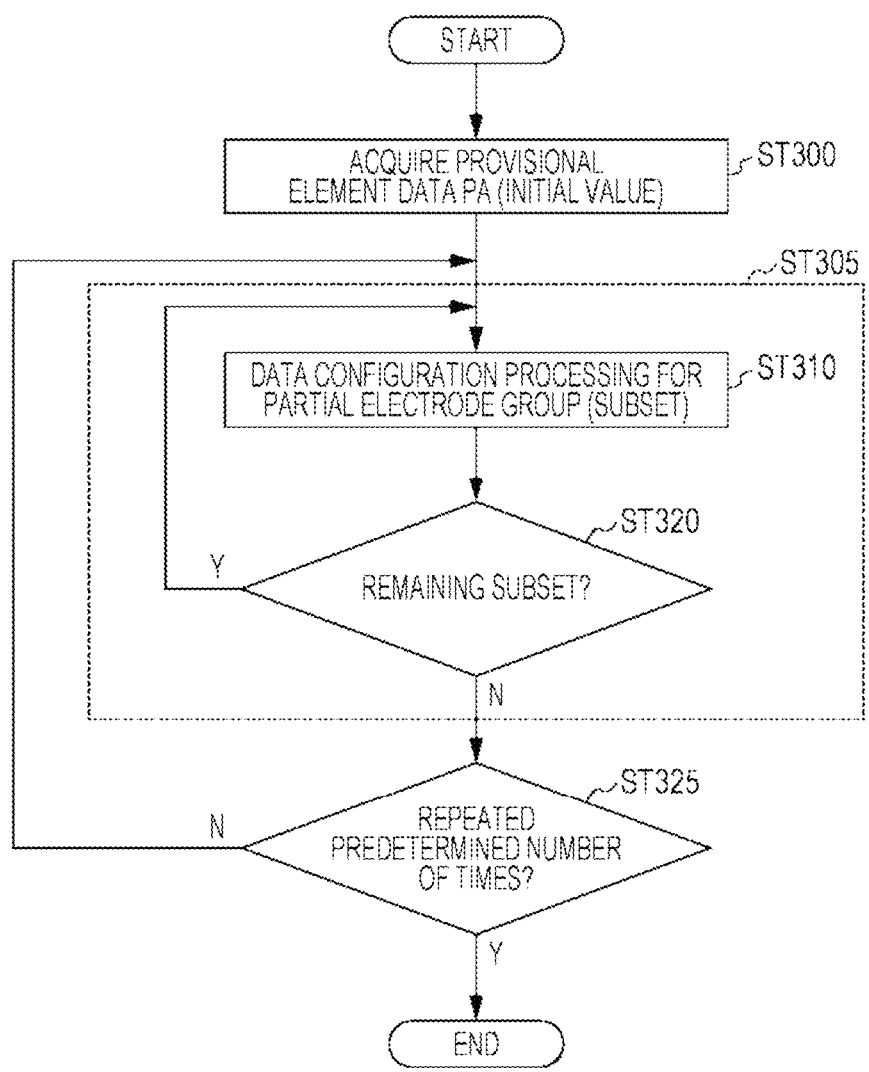
FIG. 9 is a flowchart for describing configuration processing for element data in an input device according to a second embodiment.

FIG. 9 is a flowchart for describing configuration processing for element data in the input device according to the second embodiment.

ST300:

The element data configuration part 22 acquires initial values of provisional element data $PA_1$ to $PA_m$ that are used in data configuration processing (ST305, described later). The element data configuration part 22 acquires, for example, constant data previously stored in the storage unit 30, as the initial values.

ST305:

The element data configuration part 22 uses the initial values acquired in step ST300, and repeats data configuration processing of correcting the provisional element data $PA_1$ to $PA_m$ so that provisional detection data $SA_1$ to $SA_n$ calculated from the provisional element data $PA_1$ to $PA_m$ approach detection data $S_1$ to $S_n$.

A feature of the input device according to this embodiment is that the data configuration processing in step ST305 to be repetitively executed is further divided into a plurality of partial data configuration processing (ST310). In this embodiment, a number n of electrodes $E_1$ to $E_n$ are classified into a plurality of electrode groups (subsets). The plurality of partial data configuration processing (ST310) correspond to the plurality of electrode groups on a one-to-one basis. The individual partial data configuration processing (ST310) includes processing similar to the four steps (ST220, ST225, ST230, ST235) in FIG. 4.

The element data configuration part 22 sequentially executes the plurality of partial data configuration processing (ST310) in single data configuration processing (ST305). When the partial data configuration processing (ST310) are executed for all electrode groups (subsets), the element data configuration part 22 completes the single data configuration processing in ST305 (ST320). When the single data configuration processing (ST305) is completed, the element data configuration part 22 checks the current number of repetition times of the data configuration processing (ST310). If the number of repetition times does not reach a predetermined number of times, the element data configuration part 22 repeats the data configuration processing (ST305) again. If the number of repetition times reaches the predetermined number of times, the element data configuration part 22 determines provisional element data $PA_1$ to $PA_m$ corrected by the last data configuration processing (ST305) as normal element data $P_1$ to $P_m$, and stores the normal element data $P_1$ to $P_m$ in the predetermined storage area of the storage unit 30 (ST325).

Figure 10:
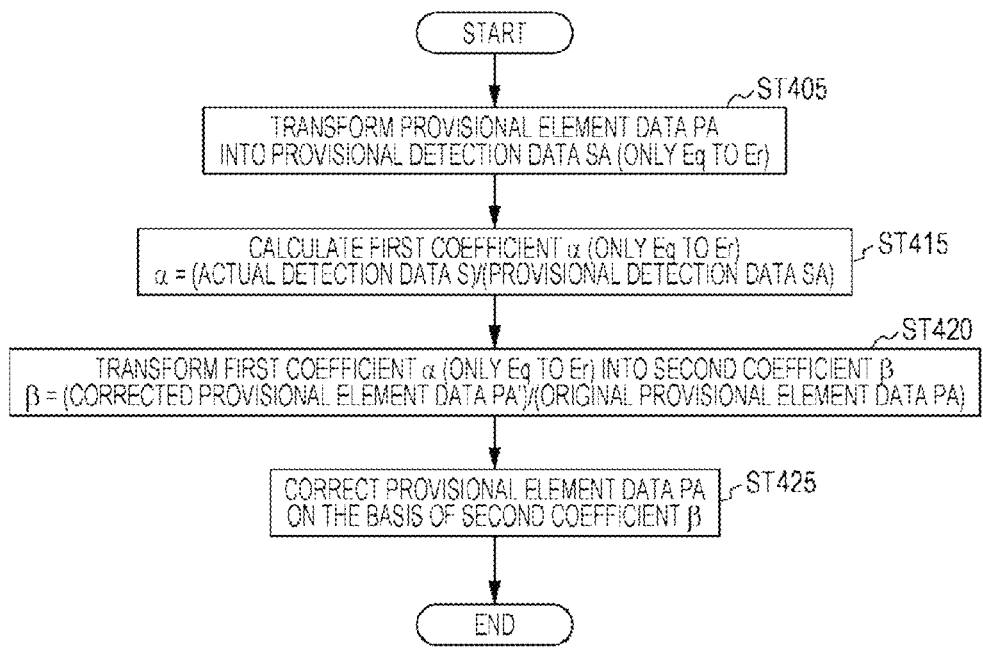
FIG. 10 is a flowchart for describing partial data configuration processing in the flowchart shown in FIG. 9.

FIG. 10 is a flowchart showing an example of single partial data configuration processing (ST305) in the flowchart shown in FIG. 9. In this example, it is assumed that one electrode group corresponding to one partial data configuration processing (ST305) is a group of a number k of electrodes $E_q$ to $E_r$ ($1 \leq q \leq r \leq n$, $r-q=k$).

ST405:

The element data configuration part 22 transforms the number n of provisional element data $PA_1$ to $PA_m$ into a number k of provisional detection data $SA_q$ to $SA_r$ corresponding to the number k of electrodes $E_q$ to $E_r$. This transformation is expressed by the following expression.

$$\begin{bmatrix} K_{q1} & K_{q2} & \cdots & K_{qm} \\ \vdots & & & \vdots \\ K_{r1} & K_{r2} & \cdots & K_{rm} \end{bmatrix} \begin{bmatrix} PA_1 \\ PA_2 \\ \vdots \\ PA_m \end{bmatrix} = \begin{bmatrix} SA_q \\ \vdots \\ SA_r \end{bmatrix} \quad (23)$$

A k×m matrix (a first partial transformation matrix) in the left term of Expression (23) is a partial matrix of the n×m matrix (the first transformation matrix K) in Expression (5) or the like.

ST415:

The element data configuration part 22 calculates first coefficients $\alpha_q$ to $\alpha_r$ representing multiplying factors by which provisional detection data $SA_q$ to $SA_r$ calculated in step ST405 are multiplied to cause the provisional detection data $SA_q$ to $SA_r$ to be equivalent to the detection data $S_q$ to $S_r$. This calculation is expressed by the following expression.

$$\begin{bmatrix} \alpha_q \\ \vdots \\ \alpha_r \end{bmatrix} = \begin{bmatrix} S_q/SA_q \\ \vdots \\ S_r/SA_r \end{bmatrix} \quad (24)$$

ST420:

The element data configuration part 22 calculates a number m of second coefficients $\beta_1$ to $\beta_m$ representing multiplying factors by which the number m of provisional element data $PA_1$ to $PA_m$ are multiplied. That is, the element data configuration part 22 transforms the number k of first coefficients $\alpha_q$ to $\alpha_r$ into the number m of second coefficients $\beta_1$ to $\beta_m$ on the basis of known information (a constant data $K_{ij}$) determined in accordance with the segment pattern and the electrode pattern.

A second coefficient $\beta_j$ in one segment $A_j$ can be approximated to a value obtained by assigning weights of constant data $K_{qj}$ to $K_{rj}$ to the number k of first coefficients $\alpha_q$ to $\alpha_r$ calculated in step ST415 and averaging the results. The second coefficient $\beta_i$ is expressed as the following expressions by this approximation.

$$\beta_j = \frac{\sum_{i=q}^{r} K_{ij}\alpha_i}{\sum_{i=q}^{r} K_{ij}} = \gamma_j \sum_{i=q}^{r} K_{ij}\alpha_i \quad (25\text{-}1)$$

$$\gamma_j = \frac{1}{\sum_{i=q}^{r} K_{ij}} \quad (25\text{-}2)$$

Using a matrix, Expression (25) is expressed by the following expression.

$$\begin{bmatrix} \gamma_1 K_{q1} & \cdots & \gamma_1 K_{r1} \\ \vdots & & \vdots \\ \gamma_m K_{qm} & \cdots & \gamma_m K_{rm} \end{bmatrix} \begin{bmatrix} \alpha_q \\ \vdots \\ \alpha_r \end{bmatrix} = \begin{bmatrix} \beta_1 \\ \beta_2 \\ \vdots \\ \beta_m \end{bmatrix} \quad (26)$$

An m×k matrix (a second partial transformation matrix) in the left term of Expression (26) is known information determined in accordance with the arrangement pattern of the number n of electrodes $E_1$ to $E_n$. A coefficient $\gamma_j$ multiplied by each component in a j-th row ($K_{qj}$ to $K_{rj}$) in the m×k second partial transformation matrix is a coefficient for adjusting the sum of the components in one row to be "1."

Then, in step ST425, the element data configuration part 22 transforms the current provisional element data $PA_1$ to $PA_m$ into new provisional element data $PA'_1$ to $PA'_m$ on the basis of the number m of second coefficients $\beta_1$ to $\beta_m$ acquired in step ST230 (Expression (12), Expression (13)).

Also in the above-described input device according to this embodiment, similarly to the first embodiment, the number m of element data $P_1$ to $P_m$ representing the approach state with respect to an object in the number m of segments can be obtained by using the number n of electrodes $E_1$ to $E_n$ fewer than the number m of segments $A_1$ to $A_m$. Hence, data representing a two-dimensional distribution of capacitance on the operation surface can be acquired while the number of electrodes is decreased as compared with the image sensing system of related art.

Also, in the input device according to this embodiment, the correction on the provisional element data $PA_1$ to $PA_m$ based on only the detection data ($S_q$ to $S_r$) corresponding to the partial electrodes ($E_q$ to $E_r$) is executed stepwise. Accordingly, as compared with the input device according to the first embodiment, the averaging effect in the transformation from a first coefficient $\alpha_i$ into a second coefficient $\beta_j$ (Expression (26)) is decreased, and the amount of change in each of the provisional element data $PA_1$ to $PA_m$ by single correction is increased. Therefore, the provisional element data $PA_1$ to $PA_m$ are more easily converged in the final values by the smaller number of repetition times than that of the input device according to the first embodiment.

Next, a modification of this embodiment is described.

Figure 11:
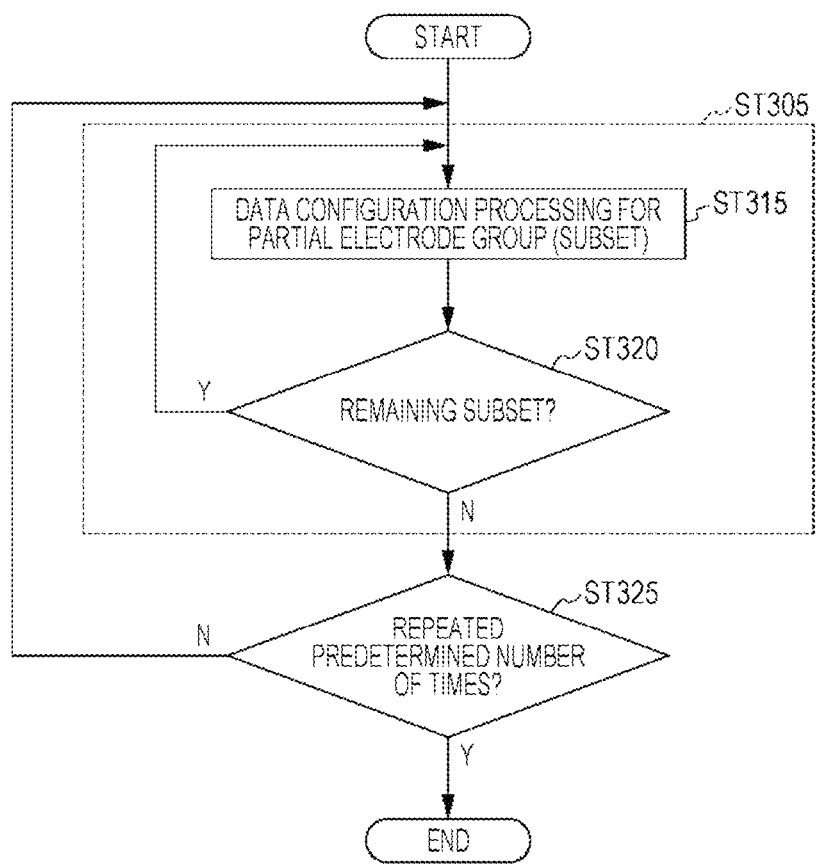
FIG. 11 is a flowchart for describing a modification of configuration processing for element data in the input device according to the second embodiment.
Figure 12:
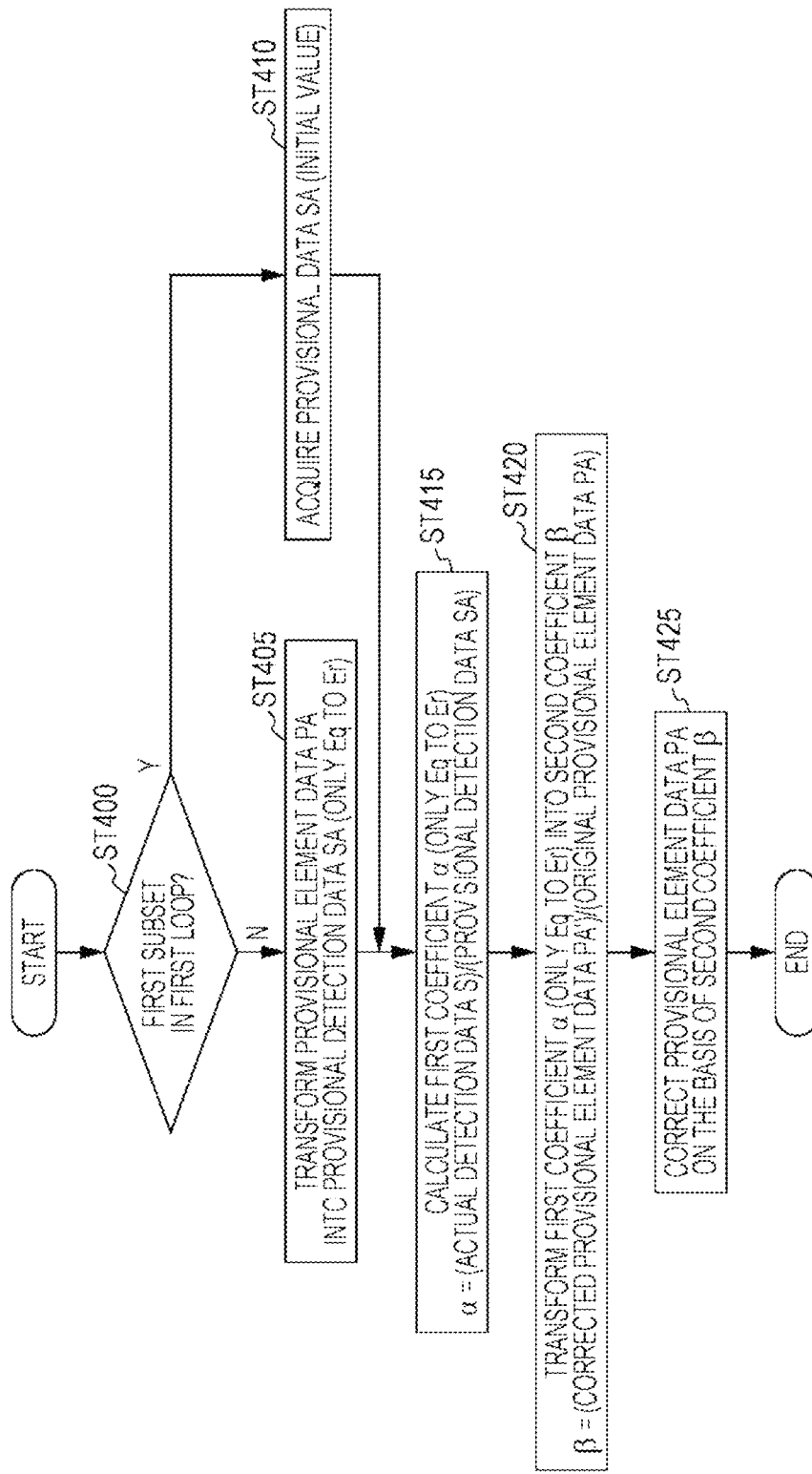
FIG. 12 is a flowchart for describing partial data configuration processing in the modification shown in FIG. 11.

FIG. 11 is a flowchart for describing a modification of configuration processing for element data in the input device according to the second embodiment. FIG. 12 is a flowchart for describing partial data configuration processing (ST315) in the modification shown in FIG. 11.

In the example in FIGS. 9 and 10, when the element data configuration part 22 executes the first partial data configuration processing (ST310) in the first data configuration processing (ST305), the element data configuration part 22 calculates the provisional detection data $SA_q$ to $SA_r$ from the initial values of the provisional element data $PA_1$ to $PA_m$ acquired in step ST300 (ST405). However, since the calculation results are normally constant regardless of the detection data $S_q$ to $S_r$, calculation does not have to be executed every time when the element data $P_1$ to $P_m$ are configured. In the example of the flowcharts shown in FIGS. 11 and 12, when the first partial data configuration processing (ST315) in the first data configuration processing (ST305) is executed, the calculation step for the provisional detection data $SA_q$ to $SA_r$ (ST405) is omitted.

That is, the element data configuration part 22 does not execute the calculation step for the provisional detection data $SA_q$ to $SA_r$ (ST405) when executing the first partial data configuration processing (ST315) in the first data configuration processing (ST305), and acquires predetermined initial values for the provisional detection data $SA_q$ to $SA_r$ from the storage unit 30 or the like (ST400, ST410). When the element data configuration part 22 executes second or later partial data configuration processing (ST315), the element data configuration part 22 calculates provisional detection data $SA_q$ to $SA_r$ on the basis of provisional element data $PA_1$ to $PA_m$ corrected by the previous partial data configuration processing in ST315 (ST405).

In this way, when the first partial data configuration processing (ST315) in the first data configuration processing (ST305) is executed, by omitting the calculation step for the provisional detection data $SA_q$ to $SA_r$ (ST405), the processing speed can be increased.

Third Embodiment

Next, a third embodiment of the present invention is described.

This embodiment relates to the electrode pattern of the sensor unit 10, and the other configuration is similar to that of the input device according to any one of the above-described embodiments.

Figure 13:
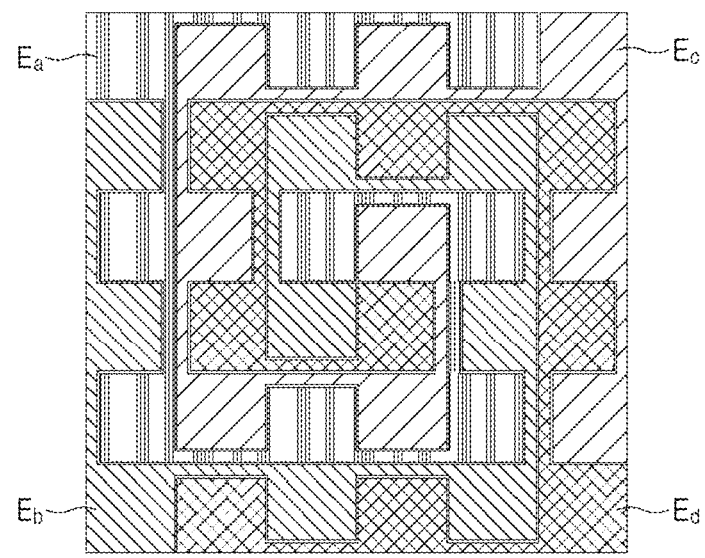
FIG. 13 is an illustration showing an example of an electrode pattern for one segment in an input device according to a third embodiment.
Figure 14A:
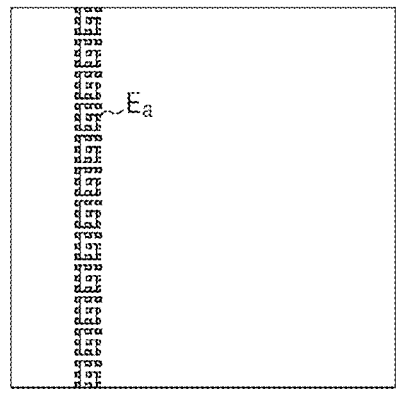
FIGS. 14A to 14D provide illustrations graphically explaining electrodes extracted by one each and extending in four directions, FIG. 14A showing electrodes extending in a longitudinal direction, FIG. 14B showing electrodes extending in a transverse direction, FIG. 14C showing electrodes extending obliquely from lower left to upper right, FIG. 14D showing electrodes extending obliquely from lower right to upper left.
Figure 14B:
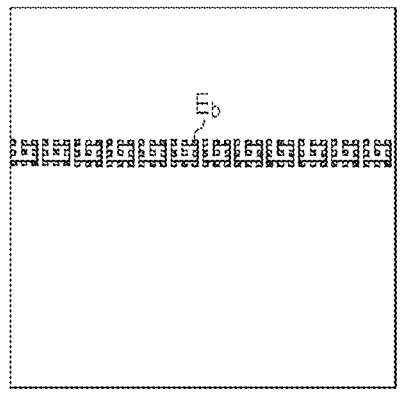
Figure 14C:
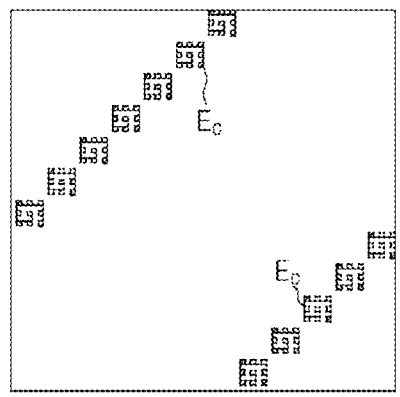
Figure 14D:
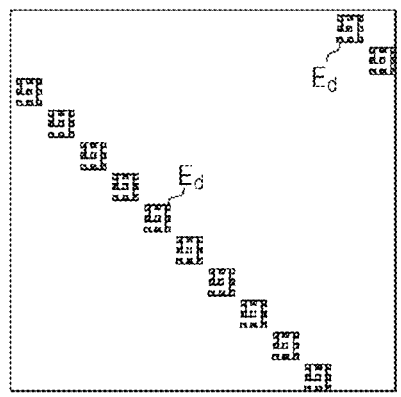

FIG. 13 is an illustration showing an example of an electrode pattern for one segment in an input device according to the third embodiment. In the electrode pattern according to this embodiment, overlapping portions of four electrodes ($E_a$, $E_b$, $E_c$, $E_d$) are gathered in one segment. The respective electrodes in one segment have spiral-like patterns similar to one another. The four spiral-like patterns densely fill the inside of one segment without overlapping one another.

The spiral-like patterns of the electrodes are linearly arranged from one segment to another adjacent segment. The arrangement directions are classified into four directions of the longitudinal direction, the transverse direction, a direction extending from lower left to upper right, and a direction extending from lower right to upper left. FIGS. 14A to 14D provide illustrations graphically explaining electrodes $E_a$, $E_b$, $E_c$, and $E_d$ extending in four directions in a manner extracted by one each. The number of segments across which one electrode extends is 12 in each direction. In the illustrated example, segments in a 12×12 matrix are formed. One spiral-like pattern and another spiral-like pattern belonging to the same electrode are connected with one another, for example, by wiring in an inner layer of a substrate through a via.

Figure 15:
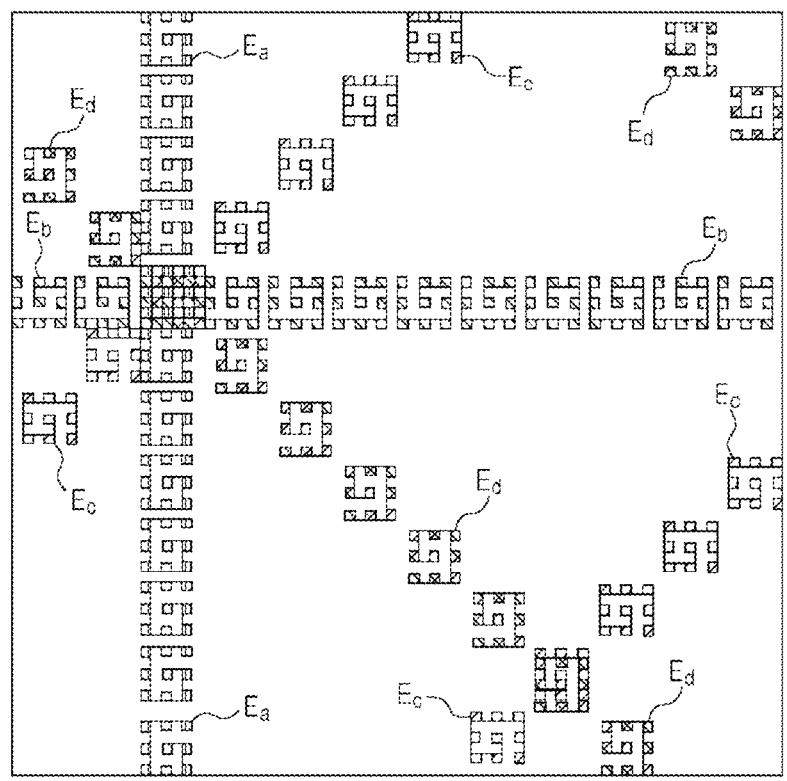
FIG. 15 is an illustration showing that the electrodes extending in the four directions intersect with one another in one segment.

FIG. 15 is an illustration showing that electrodes extending in the four directions intersect with one another in one segment. As shown in FIG. 15, each segment is located on an intersection of the electrodes extending in the four directions. When a finger or the like approaches one segment, changes in capacitance are substantially uniformly generated in four electrodes included in the segment.

Figure 16:
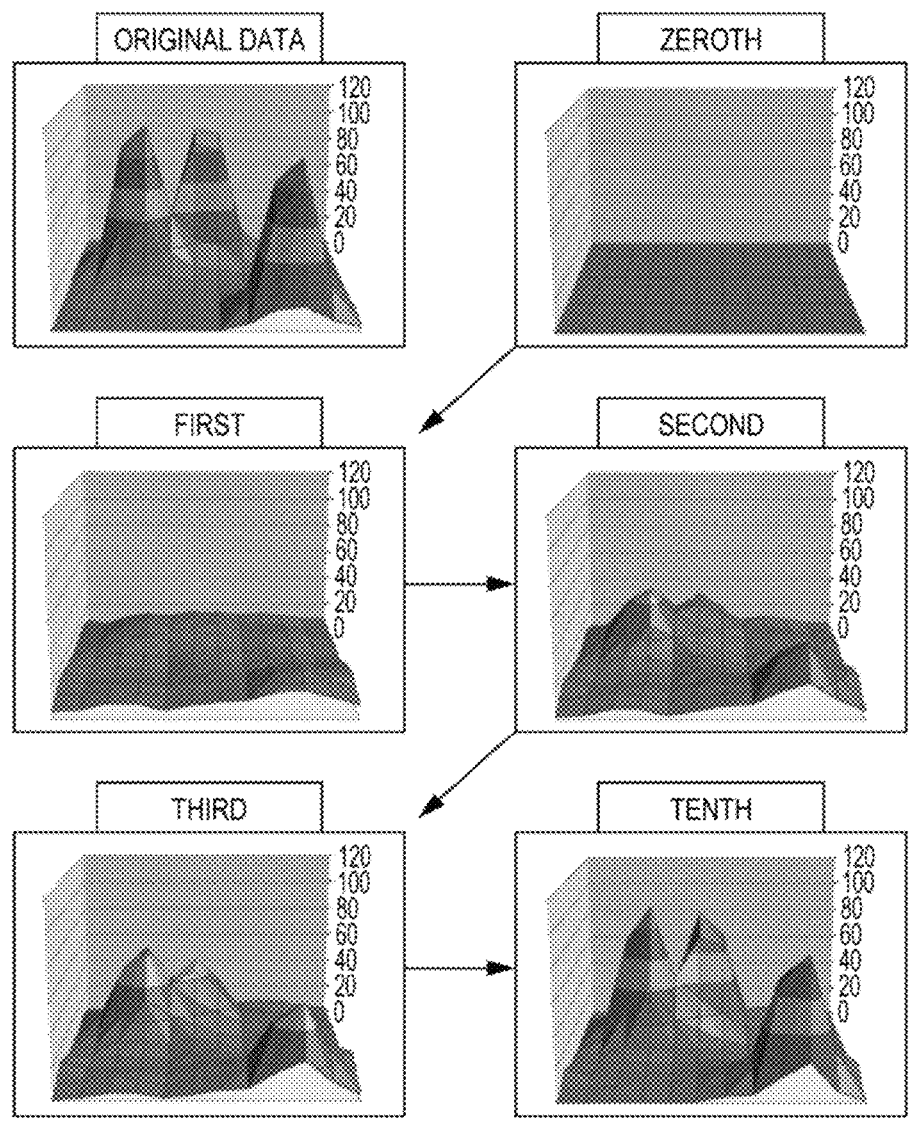
FIG. 16 is an illustration showing an example of a configuration process of element data.

FIG. 16 provides illustrations showing an example of a configuration process for element data on the basis of detection data obtained by the sensor unit 10 having the electrode pattern as shown in FIGS. 13 to 15. In the example in FIG. 16, 144 of element data when three fingers contact the operation surface are configured on the basis of 48 of detection data. If the data configuration processing is repeated upon an assumption that initial values of 144 of provisional element data are all "1," it is found that peaks due to the three fingers appear as the number of repetition times increases. After tenth data configuration processing is executed, provisional element data substantially approximated to original data are configured.

As described above, with this embodiment, the four types of electrodes linearly extending in the four directions intersect with one another in the segments arranged in a matrix-like shape. In each segment, the four types of electrodes having similar spiral-like shapes are densely combined without a gap, and fill the segment.

If the number of rows and the number of columns in segments increase, the number of segments increases in accordance with the product of the number of rows and the number of columns. However, the number of electrodes increases only in proportional to the number of rows or the number of columns. Owing to this, as the number of rows and the number of columns in the segments increase, the difference between the total number of segments and the total number of electrodes increases. That is, the number of electrodes is markedly smaller than that in the image sensing system of related art. Accordingly, the scanning time and the number of times of scanning per constant time can be increased and detection sensitivity for capacitance can be increased.

Also, since the distribution of the four electrodes in one segment is uniform, a variation in capacitance of the four electrodes is less likely generated even when the approach position of an object in a segment changes. The accuracy of configured element data can be increased.

The present invention is not limited to the above-described embodiments, and may include various variations.

In the above-described embodiments, the fixed value is used as the initial value of the data configuration processing that is repetitively executed; however, the present invention is not limited thereto. In another embodiment of the present invention, at least one immediately previously configured element data group ($P_1$ to $P_m$) may be used as the initial values of the data configuration processing.

For example, in step ST200 in FIG. 4 or step ST300 in FIG. 9, the initial values of the provisional element data $PA_1$ to $PA_m$ may use previously configured element data $P_1$ to $P_m$, the average value of a series of element data groups including the previous element data, or a value estimated by using the series of element data groups.

Figure 17:
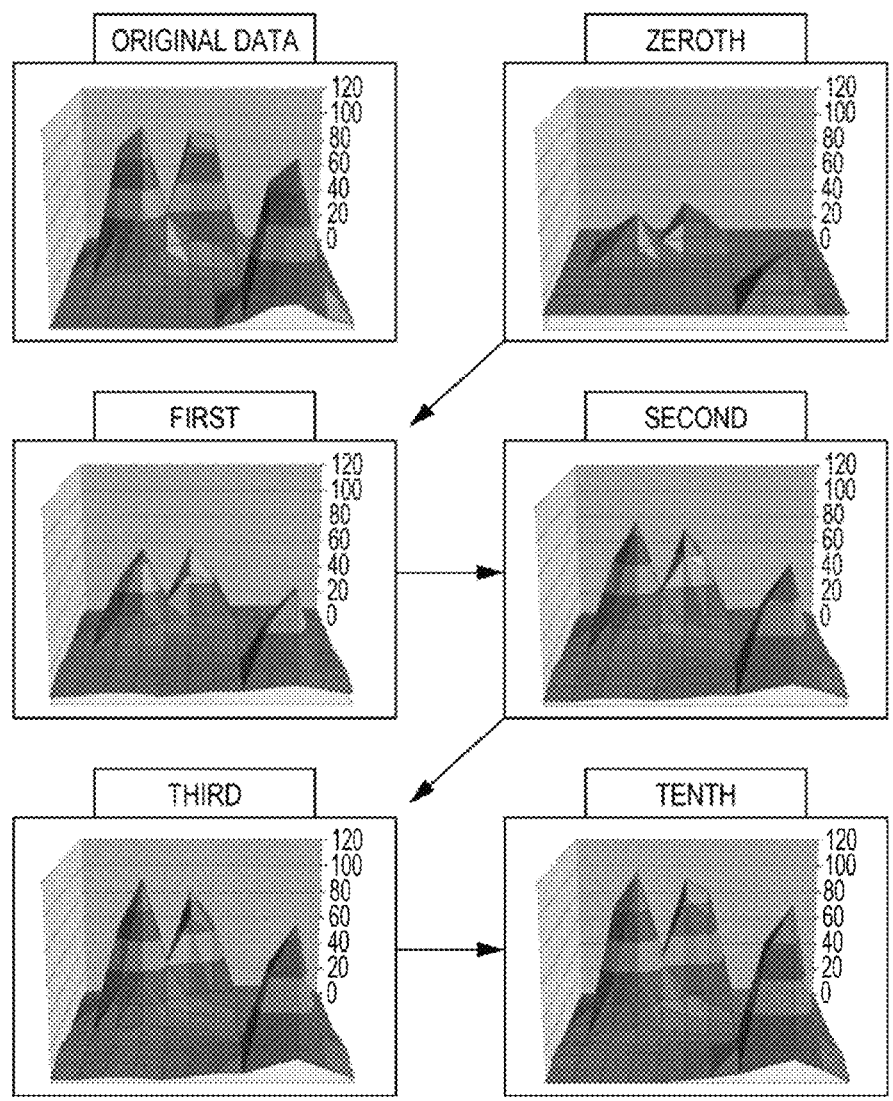
FIG. 17 is an illustration showing a case where an initial value is changed and configuration of element data similar to FIG. 16 is executed.
Figure 18A:
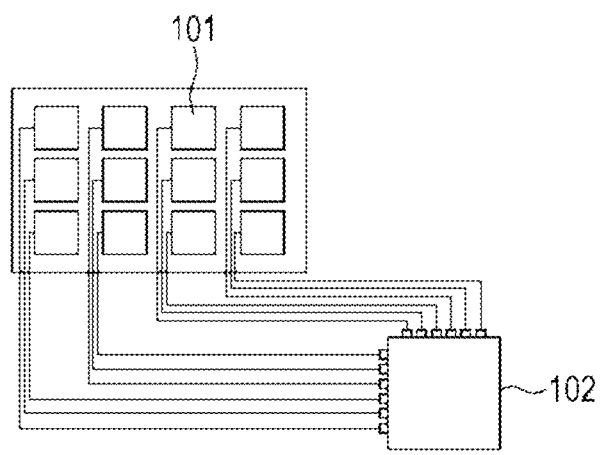
FIGS. 18A and 18B provide illustration for describing sensing systems in a self-capacitance sensor, FIG. 18A showing a configuration of an image sensing system, FIG. 18B showing a configuration of a profile sensing system.
Figure 18B:
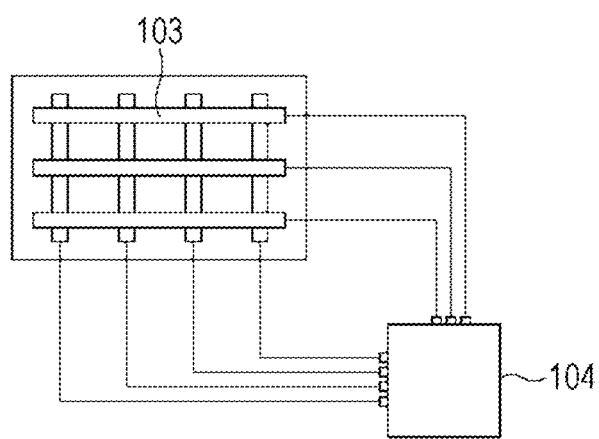

FIG. 17 is an illustration showing a case where an initial value is changed to one close to original data and configuration of element data similar to FIG. 16 is executed. Comparing FIGS. 16 and 17 with one another, in case of FIG. 16, the three fingers do not clearly appear in the third time; however, in case of FIG. 17, provisional element data substantially similar to original data can be obtained in the third time. If initial values close to original data can be estimated in this way, configuration accuracy and convergence speed of element data can be increased. The method of estimating original data may be, for example, an estimation method based on the moving direction or moving speed of a finger from immediately previously obtained element data. Original data may be estimated from immediately previously obtained element data and used as initial values, by using "a phenomenon in which the current finger is highly possibly located near the immediately previously located finger," or "a phenomenon in which, if a finger moves in one direction at a constant speed, the current finger is highly possibly located at a specific position in the direction."

What is claimed is:

1. An input device inputting information corresponding to an approach of an object with respect to an operation surface, comprising: a number n of electrodes arranged on the operation surface so that at least one of the electrodes has an overlapping portion with each of a number m of segments, the segments being configured by dividing the operation surface, n and m being natural numbers greater than 0, wherein n is smaller than m; a capacitance detection part outputting a number n of detection data corresponding to first capacitances formed between the object approaching the operation surface and the number n of electrodes; and an element data configuration part configuring element data corresponding to a third capacitance for each of the number m of segments, the third capacitance being obtained by combining a second capacitance, the second capacitance being formed between the overlapping portion of at least one of the electrodes located in one of the segments and the object, wherein each of the number n of electrodes is different from another one of the electrodes in at least one of a combination of the segments including the overlapping portion and an area of the overlapping portion included in the same segment, and wherein the element data configuration part configures a number m of the element data corresponding to the number m of segments on the basis of predetermined information relating to an area ratio of the overlapping portion of individual one of the electrodes to all the overlapping portions located in the same segment in each of the number m of segments, and the number n of detection data output from the capacitance detection part.

2. The input device according to claim 1,
wherein the element data configuration part repeats data configuration processing of correcting provisional values of the number m of element data on the basis of the predetermined information so that provisional values of the number n of detection data calculated from the provisional values of the number m of element data on the basis of the predetermined information approach the number n of detection data.

3. The input device according to claim 2,
wherein the data configuration processing includes:
first processing of transforming the provisional values of the number m of element data into the provisional values of the number n of detection data on the basis of the predetermined information,
second processing of calculating a number n of first coefficients representing multiplying factors by which the provisional values of the number n of detection data are multiplied to cause the provisional values of the number n of detection data to be equivalent to the number n of detection data,
third processing of transforming the number n of first coefficients into a number m of second coefficients by which the number m of element data are multiplied on the basis of the predetermined information, and
fourth processing of correcting the provisional values of the number m of element data on the basis of the number m of second coefficients.

4. The input device according to claim 3,
wherein, in the first processing, the element data configuration part transforms a matrix including, as components, the provisional values of the number m of element data into a matrix including, as components, the provisional values of the number n of detection data, on the basis of a first transformation matrix including, as one component, constant data corresponding to the area ratio of the overlapping portion of one of the electrodes in one of the segments and including m×n components corresponding to the number m of segments and the number n of electrodes.

5. The input device according to claim 3,
wherein, in the third processing, the element data configuration part transforms a matrix including, as components, the number n of first coefficients into a matrix including, as components, the number m of second coefficients, on the basis of a second transformation matrix including, as one component, constant data corresponding to the area ratio of the overlapping portion of one of the electrodes in one of the segments and including m×n components corresponding to the number m of segments and the number n of electrodes.

6. The input device according to claim 2, wherein the number n of electrodes are classified into a plurality of electrode groups, and wherein the element data configuration part: sequentially executes a plurality of partial data configuration processing corresponding to the plurality of electrode groups on a one-to-one basis in one of the data configuration processing, and in one of the partial data configuration processing corresponding to one of the electrode groups including a number k of the electrodes, k being a natural number greater than 0, wherein k is smaller than n, corrects the provisional values of the number m of element data on the basis of the predetermined information so that provisional values of a number k of detection data calculated from the provisional values of the number m of element data on the basis of the predetermined information approach a number k of detection data corresponding to first capacitances formed between the number k of electrodes and the object.

7. The input device according to claim 6,
wherein the one of the partial data configuration processing corresponding to the one of the electrode groups including the number k of electrodes includes:
first processing of transforming the provisional values of the number m of element data into the provisional values of the number k of detection data on the basis of the predetermined information,
second processing of calculating a number k of first coefficients representing multiplying factors by which the provisional values of the number k of detection data are multiplied to cause the provisional values of the number k of detection data to be equivalent to the number k of detection data,
third processing of transforming the number k of first coefficients into a number m of second coefficients by which the number m of element data are multiplied on the basis of the predetermined information, and
fourth processing of correcting the provisional values of the number m of element data on the basis of the number m of second coefficients.

8. The input device according to claim 7,
wherein, in the first processing, the element data configuration part transforms a matrix including, as components, the provisional values of the number m of element data into a matrix including, as components, the provisional values of the number k of detection data, on the basis of a first partial transformation matrix including, as one component, constant data corresponding to the area ratio of the overlapping portion of one of the electrodes in one of the segments and including m×k components corresponding to the number m of segments and the number k of electrodes.

9. The input device according to claim 7,
wherein, in the third processing, the element data configuration part transforms a matrix including, as components, the number k of first coefficients into a matrix including, as components, the number m of second coefficients, on the basis of a second partial transformation matrix including, as one component, constant data corresponding to the area ratio of the overlapping portion of one of the electrodes in one of the segments and including m×k components corresponding to the number m of segments and the number k of electrodes.

10. The input device according to claim 3,
wherein, in a first time of the data configuration processing, the element data configuration part omits the first processing and executes the second processing by using a number n of predetermined initial values as the provisional values of the number n of detection data.

11. The input device according to claim 3,
wherein, in a first time of the data configuration processing, the element data configuration part executes the first processing by using a number m of initial values based on at least one group of a number m of immediately previously configured element data, as the provisional values of the number m of element data.

12. The input device according to claim 7,
wherein, in a first time of the partial data configuration processing in a first time of the data configuration processing, the element data configuration part omits the first processing and executes the second processing by using a number k of predetermined initial values as the provisional values of the number k of detection data.

13. The input device according to claim 7,
wherein, in a first time of the partial data configuration processing in a first time of the data configuration processing, the element data configuration part uses a number m of initial values based on at least one group of a number m of immediately previously configured element data, as the provisional values of the number m of element data in the first processing.

14. The input device according to claim 1,
wherein a plurality of the overlapping portions of the electrodes located in the same segment each include a plurality of electrode pieces electrically connected with one another, and
wherein the plurality of electrode pieces located in the same segment are respectively adjacent to the electrode pieces included in different one of the electrodes.

* * * * *